(12) United States Patent
Nishita

(10) Patent No.: US 11,630,186 B2
(45) Date of Patent: Apr. 18, 2023

(54) TARGET DEVICE AND MEASURING SYSTEM

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 583 days.

(21) Appl. No.: 16/676,405

(22) Filed: Nov. 6, 2019

(65) Prior Publication Data
US 2020/0142031 A1 May 7, 2020

(30) Foreign Application Priority Data

Nov. 7, 2018 (JP) .............................. JP2018-209604

(51) Int. Cl.
| | |
|---|---|
| G01S 7/481 | (2006.01) |
| G01S 17/08 | (2006.01) |
| G01C 15/00 | (2006.01) |
| G01C 15/02 | (2006.01) |
| G01C 15/04 | (2006.01) |
| G02B 5/12 | (2006.01) |

(52) U.S. Cl.
CPC .............. *G01S 7/481* (2013.01); *G01C 15/00* (2013.01); *G01C 15/02* (2013.01); *G01C 15/04* (2013.01); *G01S 17/08* (2013.01); *G02B 5/12* (2013.01)

(58) Field of Classification Search
CPC ...................................................... G01S 7/481
See application file for complete search history.

(56) References Cited

U.S. PATENT DOCUMENTS

| | | | |
|---|---|---|---|
| 10,469,754 B2* | 11/2019 | Nagashima | .......... G01C 15/002 |
| 2017/0061605 A1 | 3/2017 | Nagashima et al. | |
| 2020/0142031 A1* | 5/2020 | Nishita | .................. G01C 15/02 |
| 2022/0074764 A1* | 3/2022 | Müller | ...................... G06T 7/70 |

FOREIGN PATENT DOCUMENTS

| | | |
|---|---|---|
| JP | H393721 U | 9/1991 |
| JP | 2017-044536 A | 3/2017 |
| JP | 201854541 A | 4/2018 |

OTHER PUBLICATIONS

Japanese Notice of Reasons for Refusal dated Sep. 8, 2022 in connection with Japanese Patent Application No. 2018-209604, 8 pgs. (including translation).

* cited by examiner

*Primary Examiner* — Michael A Berns
(74) *Attorney, Agent, or Firm* — Chiesa, Shahinian & Giantomasi PC

(57) ABSTRACT

A target device, which allows a sufficient amount of reflected light to be obtained from an end portion, is provided and includes a measurement section. In the target device, a retroreflective layer in which a plurality of retroreflective elements are arranged on the entire circumference in a circumferential direction about an axis is formed on at least part of the outer peripheral surface of the measurement section. The retroreflective layer is formed into an uneven shape in which a distance from the axis changes along the entire circumference in the circumferential direction.

13 Claims, 18 Drawing Sheets

TARGET DEVICE AND MEASURING SYSTEM

CROSS-REFERENCE TO RELATED APPLICATIONS

This application is based upon and claims benefit of priority from Japanese Patent Application No. 2018-209604, filed Nov. 7, 2018, the entire contents of which are incorporated herein by reference.

TECHNICAL FIELD

The present invention relates to a target device and a measuring system.

BACKGROUND

In general, when surveying is performed, a measurement target such as, e.g., a retroreflective prism (corner cube) is placed at a measuring point, and the corner cube is collimated from a measuring device (total station) disposed at a known point. The measuring device measures a distance to the corner cube and a horizontal angle and a vertical angle with respect to a known direction in a collimation direction, and determines a horizontal distance to the corner cube and a horizontal angle, and a vertical height of the corner cube (see, e.g., Japanese Patent Application Publication No. 2017-044536). At this point, a worker who performs surveying has to move the corner cube frequently and place the corner cube at the measuring point according to the number of measuring points. To cope with this, for the purpose of simplifying the placement, a method in which the corner cube is attached to a pole, and the pole is placed vertically such that the lower end of the pole indicates the measuring point is used.

In the case where the corner cube is attached to the pole, there is some distance between the corner cube and the lower end of the pole. In the case where the pole is placed, an error in horizontal distance occurs unless the pole is erected vertically with respect to the measuring point. To cope with this, a bubble tube for verticality detection is attached to the pole, and the pole is erected vertically by using the bubble tube. However, in the case where the pole cannot be erected vertically due to an obstacle or the location of the pole such as a corner of a building, the pole is placed at a position displaced from the measuring point, the position displaced from the measuring point is measured, the distance of the displacement is measured by another means, and the measuring point is indirectly measured. In addition, at a place where the pole cannot be placed vertically such as a position on a wall surface of a building or the like, the measuring point cannot be measured directly.

For example, see Japanese Patent Application Publication No. 2017-044536.

SUMMARY

On the other hand, it is conceivable to use a method in which a target having a feature in its shape is used as the measurement target, and the position of the measuring point is measured from the shape of the target. By using this method, even when the target is not erected vertically, it is possible to directly measure the position of the measuring point. However, in the case where a sufficient amount of reflected light reflected by the target is not obtained for measuring light emitted by a measuring device, it becomes difficult for the measuring device to differentiate between the reflected light reflected from the target and reflected light reflected from another structure. To cope with this, it is conceivable to use a method in which a sheet material in which a plurality of retroreflective elements are arranged is stuck to the surface of the target, so that a sufficient amount of reflected light is obtained from the target.

However, in the retroreflective element, when an incident angle (an angle which the measuring light forms with a normal to an incident surface at a point of incidence) of the measuring light is greater than a predetermined angle (e.g., 45 degrees), the reflected light cannot be obtained. Consequently, in the case where the sheet material is stuck to a cylindrical or spherical target, there is a possibility that the reflected light cannot be obtained at an end portion of the target and that the shape of the target and the position of the measuring point cannot be measured accurately.

The present invention has been made in order to solve the above problem, and an object thereof is to provide a target device which allows a sufficient amount of reflected light to be obtained from an end portion, and a measuring system which includes the target device.

According to the present invention, the above problem is solved by a target device which is measured with measuring light emitted by a measuring device, the target device including a measurement section which is substantially in a shape of a solid of revolution about an axis, wherein a retroreflective layer in which a plurality of retroreflective elements are arranged on an entire circumference in a circumferential direction about the axis is formed on at least part of an outer peripheral surface of the measurement section, and the retroreflective layer is formed into an uneven shape in which a distance from the axis changes along the entire circumference in the circumferential direction.

According to the target device of the present invention, the retroreflective layer is formed into the uneven shape in which the distance from the axis changes along the entire circumference in the circumferential direction. Consequently, in part of the retroreflective layer disposed at an end portion of the target device, an incident angle which the measuring light forms with a normal to an incident surface of the retroreflective element is equal to or less than a predetermined angle (e.g., an angle in a range of 45 degrees or more and 60 degrees or less). With this, it becomes possible to obtain a sufficient amount of reflected light from the end portion of the target device.

In the target device of the present invention, preferably, the measurement section includes a first auxiliary measurement section which has a first outer diameter about the axis, a second auxiliary measurement section which has a second outer diameter about the axis, and a reference measurement section which is disposed between the first auxiliary measurement section and the second auxiliary measurement section, and has a predetermined outer diameter, which is greater than each of the first outer diameter and the second outer diameter, about the axis.

According to the target device having the present configuration, the predetermined outer diameter of the reference measurement section is greater than each of the outer diameters of the first auxiliary measurement section and the second auxiliary measurement section. Consequently, the measuring device can detect the position of the reference measurement section which is larger in outer diameter than each of the first auxiliary measurement section and the second auxiliary measurement section and measure a measuring point (the tip of the target device) disposed a known distance away from the reference measurement section by applying the measuring light to the target device and receiving reflected light. In addition, the measuring device is capable of measuring the tilt of the axis of the target device with respect to a distance measuring light optical axis of distance measuring light by detecting the positions of the first auxiliary measurement section and the second auxiliary measurement section, thereby correcting the measurement result of the measuring point. Therefore, even when the target device is not erected vertically, it is possible to directly measure the position of the measuring point using the measuring device.

In the target device of the present invention, preferably, the retroreflective layer has a plurality of first areas in each of which a distance from the axis gradually increases along the circumferential direction and an angle which the first area forms with the circumferential direction is not less than a predetermined angle, and a plurality of second areas in each of which a distance from the axis gradually decreases along the circumferential direction and an angle which the second area forms with the circumferential direction is not less than the predetermined angle.

According to the target device having the present configuration, the retroreflective layer has the plurality of first areas and the plurality of second areas. With regard to the measuring light which incidents on the first area and the second area disposed at each end portion of the target device in a width direction when viewed from the measuring device, an angle which the measuring light forms with the incident surface of the retroreflective element is not less than a predetermined angle (e.g., 45 degrees or more), and hence the incident angle which the measuring light forms with the normal to the incident surface is sufficiently reduced, and it is possible to reliably obtain a sufficient amount of reflected light from the end portion of the target device.

In the target device having the above configuration, preferably, each of the first area and the second area is a surface formed so as to extend parallel to the axis, and the first area and the second area are formed at a regular interval along the circumferential direction.

According to the target device having the present configuration, each of the first area and the second area is the surface formed so as to extend parallel to the axis, and hence the same reflected light is reflected from the target device irrespective of the position of the retroreflective layer along the axis on which the measuring light incidents. In addition, the first areas and the second areas are formed at regular intervals along the circumferential direction, and hence the same reflected light can be reflected toward the measuring device from the target device irrespective of the direction about the axis in which the target device is disposed.

In the target device having the above configuration, preferably, the first area and the second area are flat surfaces formed so as to extend parallel to the axis, and are disposed adjacent to each other.

According to the target device having the present configuration, each of the first area and the second area is the flat surface, and hence reflected light is reflected from the entire area on which the measuring light incidents in each flat surface. In addition, the flat surfaces of the first area and the second area are disposed adjacent to each other, and hence it is possible to bring the areas from which the reflected light is reflected close to each other.

In the target device having the above configuration, preferably, the retroreflective layer has a third area which is a curved surface which has the same distance from the axis and is formed so as to extend parallel to the axis, and the first area and the second area are connected to each other via the third area.

According to the target device having the present configuration, in the third area disposed in the central portion of the target device in the width direction when viewed from the measuring device, an angle formed by the measuring light and the incident surface of the retroreflective element is approximately 90°. Consequently, the target device having the present configuration is capable of reflecting a sufficient amount of reflected light for the measuring light toward the measuring device.

In the target device having the above configuration, preferably, the retroreflective layer is formed by disposing tubes each of which has a third outer diameter which is less than each of the first outer diameter and the second outer diameter, and in each of which the plurality of retroreflective elements are arranged on a surface on the entire circumference in the circumferential direction such that the tubes are adjacent to each other.

According to the target device having the present configuration, it is possible to easily form the retroreflective layer having an uneven shape by preparing the each of the tubes in which the retroreflective elements are arranged as a component in advance and disposing the tubes on the entire circumference in the circumferential direction such that the tubes are adjacent to each other.

In the target device having the above configuration, preferably, the reference measurement section includes a main body portion which is formed into a substantially spherical shape, and a plurality of triangular pyramidal protrusions each of which is attached to an outer peripheral surface of the main body portion and has three surfaces orthogonal to each other and a bottom surface intersecting the three surfaces, and the retroreflective layer in which the plurality of retroreflective elements are arranged is formed on each of the three surfaces of the protrusion.

According to the target device having the present configuration, the protrusion having the triangular pyramidal shape obtained by cutting off one corner from a cube is formed on the outer peripheral surface of the main body portion of the reference measurement section which is formed into the substantially spherical shape. The retroreflective layer is formed on each of the three surfaces of the protrusion which are orthogonal to each other, and hence it is possible to provide the target device which allows a sufficient amount of reflected light to be obtained from the end portion.

According to the present invention, the above problem is solved by a measuring system including the target device having any one of the above configurations, and a measuring device which is configured to detect a measuring point of the target device by applying measuring light to the target device and receiving reflected light from the target device.

According to the measuring system of the present invention, it is possible to obtain a sufficient amount of reflected light from the end portion of the target device.

According to the present invention, it is possible to provide the target device which allows a sufficient amount of reflected light to be obtained from the end portion, and the measuring system which includes the target device.

DETAILED DESCRIPTION

First Embodiment

Hereinbelow, a description will be given of a surveying system (measuring system) according to a first embodiment of the present invention with reference to the drawings. The surveying system of the present embodiment includes a measuring device 100 configured to emit measuring light, and a target device 200 which is measured with the measuring light emitted by the measuring device 100.

Figure 1:
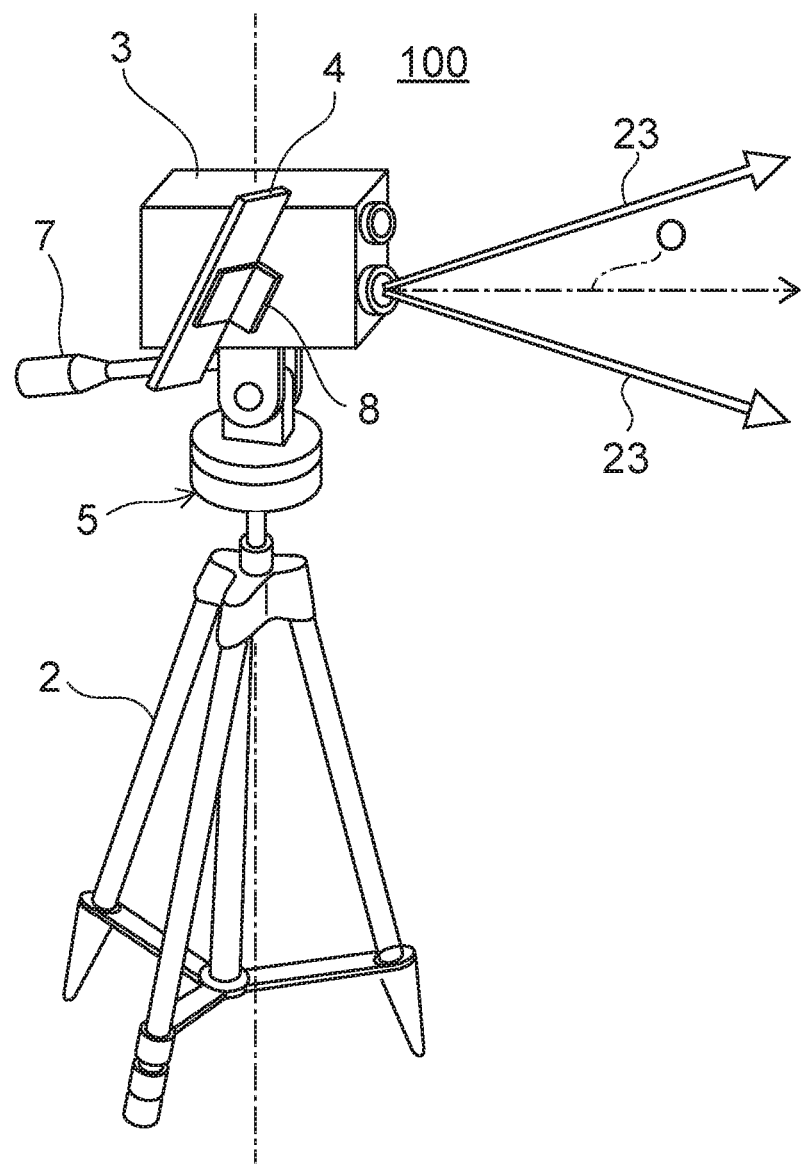
FIG. 1 is an external view of a measuring device including a laser scanner according to a first embodiment of the present invention.

A description will be given of the outline of the measuring device 100 according to the present embodiment. In FIG. 1, O indicates an optical axis which is not deflected by a deflection section 35 described later, and the optical axis in this state is used as a reference optical axis. The measuring device 100 is constituted mainly by a tripod 2 serving as a supporting device, a laser scanner 3, an operation device 4, and a rotating base 5. The rotating base 5 is attached to the upper end of the tripod 2, and the laser scanner 3 is attached to the rotating base 5 so as to be able to rotate laterally and longitudinally. The rotating base 5 has the function of detecting a rotation angle in a lateral direction (a rotation angle in a horizontal direction) of the laser scanner 3.

A lever 7 which extends in the lateral direction is provided in the rotating base 5. The laser scanner 3 can be rotated in an up and down direction (vertical direction) or the lateral direction (horizontal direction) by an operation of the lever 7, and the laser scanner 3 can also be fixed so as to take a required attitude by the operation of the lever 7.

The laser scanner 3 includes a distance measurement section 3A and an attitude detection section 17, and the distance measurement section 3A performs measurement by applying measuring light 23 to an object to be measured or an area to be measured, and receiving reflected measuring light 24. The attitude detection section 17 can detect the attitude of the laser scanner 3 with respect to verticality (or horizontality) with high accuracy.

The operation device 4 has a communication function of performing communication with the laser scanner 3 via wired or wireless means required. In addition, the operation device 4 is attachable to and detachable from the laser scanner 3 via an attachment 8, the detached operation device 4 can be held by one hand and operated, and the laser scanner 3 can be remotely operated by the operation device 4.

Further, an image, a measurement state, and a measurement result are transmitted to the operation device 4 from the laser scanner 3, and the image, the measurement state, and the measurement result are stored in the operation device 4 and are displayed in a display section (not shown) of the operation device 4. The operation device 4 may be, e.g., a smartphone.

Figure 2:
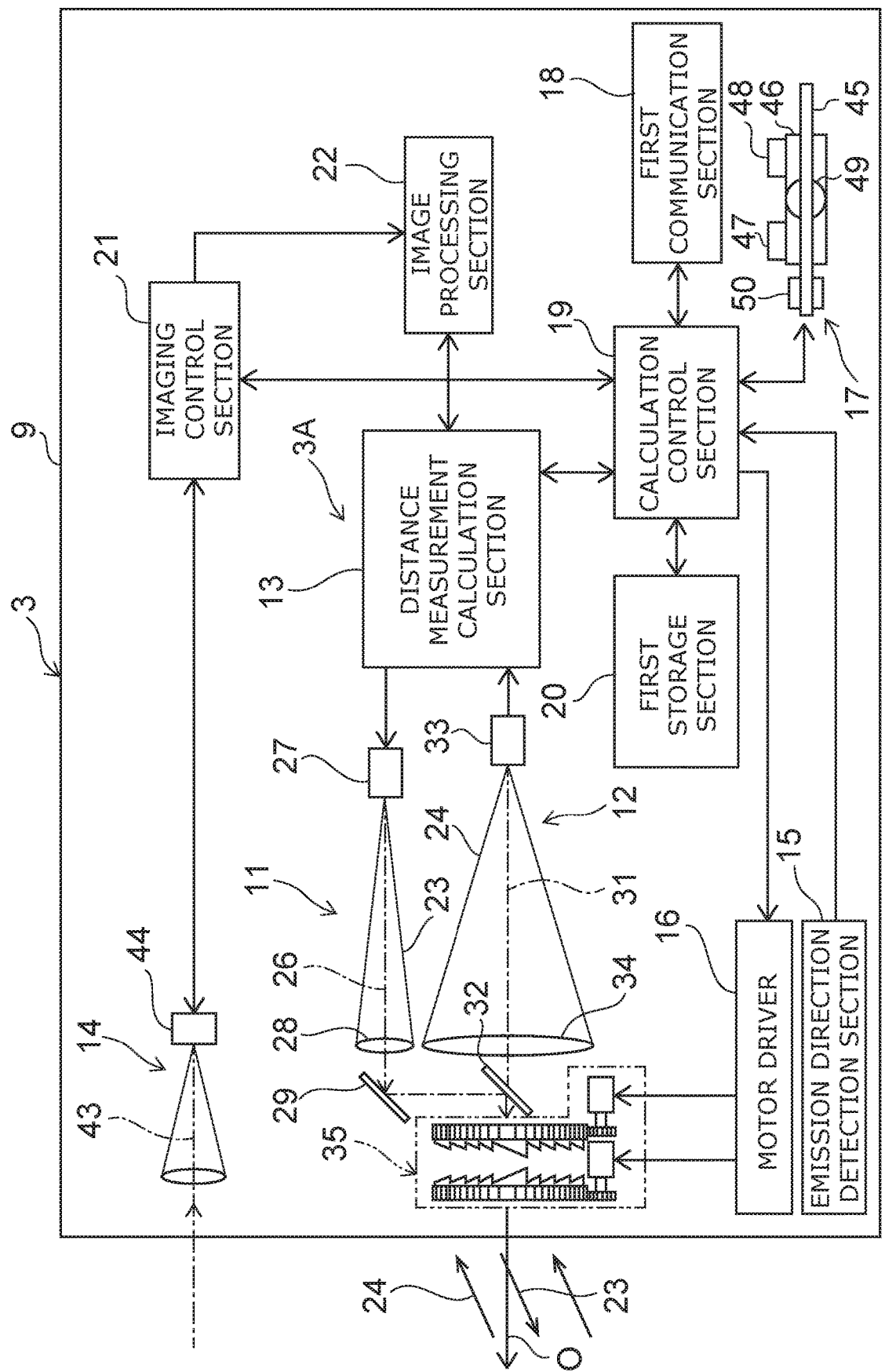
FIG. 2 is a schematic configuration diagram of the laser scanner shown in FIG. 1.

A description will be given of the laser scanner 3 with reference to FIG. 2.

The laser scanner 3 includes a measuring light emission section 11, a light reception section 12, a distance measurement calculation section 13, an imaging section 14, an emission direction detection section 15, a motor driver 16, an attitude detection section 17, a first communication section 18, a calculation control section 19, a first storage section 20, an imaging control section 21, and an image processing section 22, and these sections are accommodated in and integrated with a case 9. Note that the measuring light emission section 11, the light reception section 12, and the distance measurement calculation section 13 constitute the distance measurement section 3A.

The measuring light emission section 11 has an emitted light optical axis 26, and a light emitting element 27 such as, e.g., a laser diode (LD) is provided on the emitted light optical axis 26. In addition, a projecting lens 28 is provided on the emitted light optical axis 26. Further, the emitted light optical axis 26 is deflected by a first reflection mirror 29 serving as a deflecting optical member provided on the emitted light optical axis 26 and a second reflection mirror 32 serving as a deflecting optical member provided on a received light optical axis 31 (described later) so as to match the received light optical axis 31. The first reflection mirror 29 and the second reflection mirror 32 constitute an emitted light optical axis deflection section. The light emitting element 27 emits a pulsed laser beam, and the measuring light emission section 11 emits the pulsed laser beam emitted from the light emitting element 27 as the measuring light 23.

A description will be given of the light reception section 12. The reflected measuring light 24 from an object to be measured (i.e., a measuring point) enters the light reception section 12. The light reception section 12 has the received light optical axis 31 and, as described above, the emitted light optical axis 26 deflected by the first reflection mirror 29 and the second reflection mirror 32 matches the received light optical axis 31.

The deflection section 35 (described later) is disposed on the deflected emitted light optical axis 26, i.e., on the received light optical axis 31. The straight optical axis passing through the center of the deflection section 35 serves as the reference optical axis O. The reference optical axis O matches the emitted light optical axis 26 when the emitted light optical axis 26 is not deflected by the deflection section 35 or the received light optical axis 31.

An image-forming lens 34 is disposed on the received light optical axis 31 which has entered the light reception section 12 through the deflection section 35, and a light receiving element 33 such as, e.g., a photodiode (PD) is also provided. The image-forming lens 34 focuses the reflected measuring light 24 on the light receiving element 33. The light receiving element 33 receives the reflected measuring light 24 and generates a light reception signal. The light reception signal is inputted to the distance measurement calculation section 13. The distance measurement calculation section 13 performs measurement of a distance to the measuring point based on the light reception signal.

Figure 3:
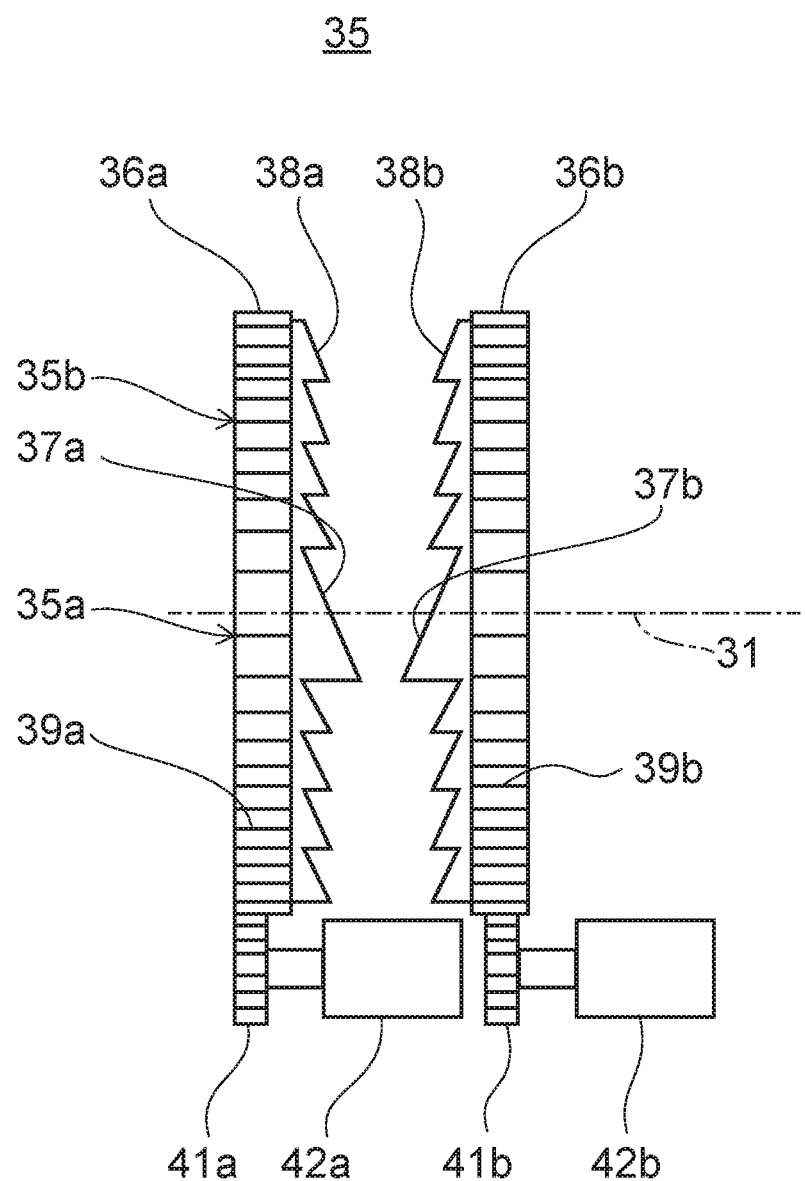
FIG. 3 is a schematic view of an optical axis deflection section in the laser scanner shown in FIG. 1.

A description will be given of the deflection section 35 with reference to FIG. 3. The deflection section 35 is constituted by a pair of optical prisms 36a and 36b. Each of the optical prisms 36a and 36b is disk-shaped, and the optical prisms 36a and 36b are disposed on the received light optical axis 31 so as to be orthogonal to the received light optical axis 31, overlap each other, and be parallel to each other. A Risley prism is preferably used as each of the optical prisms 36a and 36b in terms of a reduction in the size of a device. The central portion of the deflection section 35 is used as a measuring light deflection section 35a serving as a first deflection section through which the measuring light 23 passes and from which the measuring light 23 is emitted, and a portion of the deflection section 35 other than the central portion thereof is used as a reflected measuring light deflection section 35b serving as a second deflection section through which the reflected measuring light 24 passes and from which the reflected measuring light 24 enters.

The Risley prisms used as the optical prisms 36a and 36b are constituted by prism elements 37a and 37b and a large number of prism elements 38a and 38b which are formed parallel to each other, and are disk-shaped. The optical prisms 36a and 36b, the prism elements 37a and 37b, and the prism elements 38a and 38b have the same optical characteristics.

The prism elements 37a and 37b constitute the measuring light deflection section 35a, and the prism elements 38a and 38b constitute the reflected measuring light deflection section 35b. The Risley prism may be produced from optical glass and may also be molded with an optical plastic material. By molding the Risley prism with the optical plastic material, it is possible to produce an inexpensive Risley prism.

The optical prisms 36a and 36b are disposed so as to be able to rotate about the received light optical axis 31 independently of each other. The rotation directions, rotation amounts, and rotation speeds of the optical prisms 36a and 36b are controlled independently of each other, whereby the optical prisms 36a and 36b deflect the measuring light 23 passing along the emitted light optical axis 26 in any direction, and deflect the reflected measuring light 24 such that the reflected measuring light 24 is parallel to the received light optical axis 31. The outer shape of each of the optical prisms 36a and 36b is a circular shape with the received light optical axis 31 serving as the center, and the diameter of each of the optical prisms 36a and 36b is set such that a sufficient amount of light can be acquired in consideration of the spread of the reflected measuring light 24.

A ring gear 39a is fitted on the outer periphery of the optical prism 36a, and a ring gear 39b is fitted on the outer periphery of the optical prism 36b. A drive gear 41a is engaged with the ring gear 39a, and the drive gear 41a is fixed to an output shaft of a motor 42a. Similarly, a drive gear 41b is engaged with the ring gear 39b, and the drive gear 41b is fixed to an output shaft of a motor 42b. The motors 42a and 42b are electrically connected to the motor driver 16.

As each of the motors 42a and 42b, a motor of which a rotation angle can be detected or a motor which rotates correspondingly to a drive input value such as, e.g., a pulse motor is used. Alternatively, the rotation amount of the motor may be detected by using a rotation angle detector which detects the rotation amount (rotation angle) of the motor such as, e.g., an encoder. The rotation amounts of the motors 42a and 42b are detected, and the motors 42a and 42b are individually controlled by the motor driver 16. Note that the encoders may be directly attached to the ring gears 39a and 39b, and the rotation angles of the ring gears 39a and 39b may be directly detected by the encoders.

The drive gears 41a and 41b and the motors 42a and 42b are provided at positions which do not interfere with the measuring light emission section 11 such as, e.g., positions under the ring gears 39a and 39b.

The projecting lens 28, the first reflection mirror 29, the second reflection mirror 32, and the measuring light deflection section 35a constitute a projecting optical system, and the reflected measuring light deflection section 35b and the image-forming lens 34 constitute a light receiving optical system.

The distance measurement calculation section 13 controls the light emitting element 27, and causes the light emitting element 27 to emit the pulsed laser beam as the measuring light 23. The measuring light 23 is deflected so as to travel to the measuring point by the prism elements 37a and 37b (the measuring light deflection section 35a).

The reflected measuring light 24 reflected from the object to be measured enters the light reception section 12 via the prism elements 38a and 38b (the reflected measuring light deflection section 35b) and the image-forming lens 34, and is received by the light receiving element 33. The light receiving element 33 sends the light reception signal to the distance measurement calculation section 13, the distance measurement calculation section 13 performs the distance measurement of the measuring point (a point to which the measuring light 23 is applied) for each pulsed light based on the light reception signal from the light receiving element 33, and distance measurement data is stored in the first storage section 20. Thus, it is possible to acquire the distance measurement data at each measuring point by performing the distance measurement for each pulsed light while performing scanning with the measuring light 23.

The emission direction detection section 15 detects the rotation angles of the motors 42a and 42b by counting drive pulses inputted to the motors 42a and 42b. Alternatively, the emission direction detection section 15 detects the rotation angles of the motors 42a and 42b based on signals from the encoders. In addition, the emission direction detection section 15 calculates the rotation positions of the optical prisms 36a and 36b based on the rotation angles of the motors 42a and 42b.

Further, the emission direction detection section 15 calculates the emission direction of the measuring light 23 based on the refractive indexes and the rotation positions of the optical prisms 36a and 36b, and the calculation result is inputted to the calculation control section 19. The calculation control section 19 can determine three-dimensional data of the measuring point by calculating the horizontal angle and the vertical angle of the measuring point with respect to the reference optical axis O from the emission direction of the measuring light 23 and associating the horizontal angle and the vertical angle with the distance measurement data for each measuring point.

A description will be given of the attitude detection section 17. The attitude detection section 17 has a frame 45, and the frame 45 is fixed to the case 9 or a structural member and integrated with the laser scanner 3. A sensor block 46 is attached to the frame 45 via a gimbal. The sensor block 46 can rotate 360 degrees about two axes which are orthogonal to each other. A first tilt sensor 47 and a second tilt sensor 48 are attached to the sensor block 46.

The first tilt sensor 47 detects horizontality with high accuracy, and an example of the first tilt sensor 47 includes a tilt detector which causes detecting light to incident on a horizontal liquid level and detects horizontality based on change of the reflection angle of reflected light, or a bubble tube which detects a tilt based on change of the position of a bubble filled in the bubble tube. The second tilt sensor 48 detects tilt change with high responsiveness, and an example of the second tilt sensor 48 includes an acceleration sensor.

The relative rotation angles of the sensor block 46 with respect to the two axes of the frame 45 are detected by encoders 49 and 50. Motors (not shown) which rotate the sensor block 46 and hold the sensor block 46 horizontally are provided for the two axes, and the motors are controlled by the calculation control section 19 such that the sensor block 46 is held horizontally based on detection results from the first tilt sensor 47 and the second tilt sensor 48.

In the case where the sensor block 46 is tilted (in the case where the laser scanner 3 is tilted), the relative rotation angles with respect to the sensor block 46 are detected by the encoders 49 and 50, and the tilt angle and the tilt direction of the laser scanner 3 are detected based on the detection results of the encoders 49 and 50. The sensor block 46 can rotate 360 degrees about the two axes, and hence it is possible to detect the attitude in every direction irrespective of the attitude of the attitude detection section 17 (e.g., even in the case where the attitude detection section 17 is turned upside down).

In the attitude detection, in the case where high responsiveness is required, the attitude detection and attitude control are performed based on the detection result of the second tilt sensor 48. However, in general, the detection accuracy of the second tilt sensor 48 is lower than that of the first tilt sensor 47. The attitude detection section 17 includes the first tilt sensor 47 having high accuracy and the second tilt sensor 48 having high responsiveness, whereby the attitude control is performed based on the detection result of the second tilt sensor 48, and the attitude detection having high accuracy is allowed by the first tilt sensor 47.

It is possible to calibrate the detection result of the second tilt sensor 48 by using the detection result of the first tilt sensor 47. That is, when a deviation occurs between the values of the encoders 49 and 50 when horizontality is detected by the first tilt sensor 47, i.e., between the actual tilt angle and the tilt angle detected by the second tilt sensor 48, it is possible to calibrate the tilt angle of the second tilt sensor 48 based on the deviation.

Consequently, when a relationship between the detected tilt angle of the second tilt sensor 48 and the tilt angle determined based on the horizontality detection by the first tilt sensor 47 and the detection results of the encoders 49 and 50 is acquired in advance, it is possible to calibrate the tilt angle detected by the second tilt sensor 48, and improve accuracy in attitude detection with high responsiveness by the second tilt sensor 48.

When a fluctuation in tilt is large and when the change of the tilt is quick, the calculation control section 19 controls the motors based on a signal from the second tilt sensor 48. In addition, when the fluctuation in tilt is small and when the change of the tilt is gentle, i.e., in a state in which the first tilt sensor 47 can follow the change of the tilt, the calculation control section 19 controls the motors based on a signal from the first tilt sensor 47.

Note that the first storage section 20 stores comparison data indicating a comparison result between the detection result of the first tilt sensor 47 and the detection result of the second tilt sensor 48. The detection result of the second tilt sensor 48 is calibrated based on the signal from the second tilt sensor 48. With this calibration, it is possible to increase the detection accuracy of the detection result of the second tilt sensor 48 to a level of the detection accuracy of the first tilt sensor 47. Therefore, it is possible to implement high responsiveness while maintaining high accuracy in the attitude detection by the attitude detection section 17.

The imaging section 14 is a camera which has an imaging optical axis 43 parallel to the reference optical axis O of the laser scanner 3, and has an angle of view of, e.g., 50°, and acquires image data including a scan area of the laser scanner 3. A relationship among the imaging optical axis 43, the emitted light optical axis 26, and the reference optical axis O is known. In addition, the imaging section 14 can acquire a moving image or a continuous image.

The imaging control section 21 controls imaging of the imaging section 14. In the case where the imaging section 14 captures the moving image or the continuous image, the imaging control section 21 synchronizes timing at which a frame image constituting the moving image or the continuous image is acquired and timing at which scanning is performed by the laser scanner 3. The calculation control section 19 also executes association of the image with point group data.

An image sensor 44 of the imaging section 14 is a CCD or a CMOS sensor which is an aggregate of pixels, and the position of each pixel on a picture element can be identified. For example, each pixel has pixel coordinates in a coordinate system which uses the imaging optical axis 43 as the origin, and the position on the picture element is identified by using the pixel coordinates. The image processing section 22 performs image processing in which information displayed in the operation device 4 is superimposed on image data acquired in the imaging section 14. An image generated by the image processing section 22 is displayed on an operation screen 4A of the operation device 4 by the calculation control section 19.

A description will be given of the measurement operation of the laser scanner 3. The tripod 2 is placed at a known point or a predetermined point, and the reference optical axis O is directed to the object to be measured. The horizontal angle of the reference optical axis O at this point is detected by the horizontal angle detection function of the rotating base 5, and the tilt angle of the reference optical axis O with respect to horizontality is detected by the attitude detection section 17.

Figure 4:
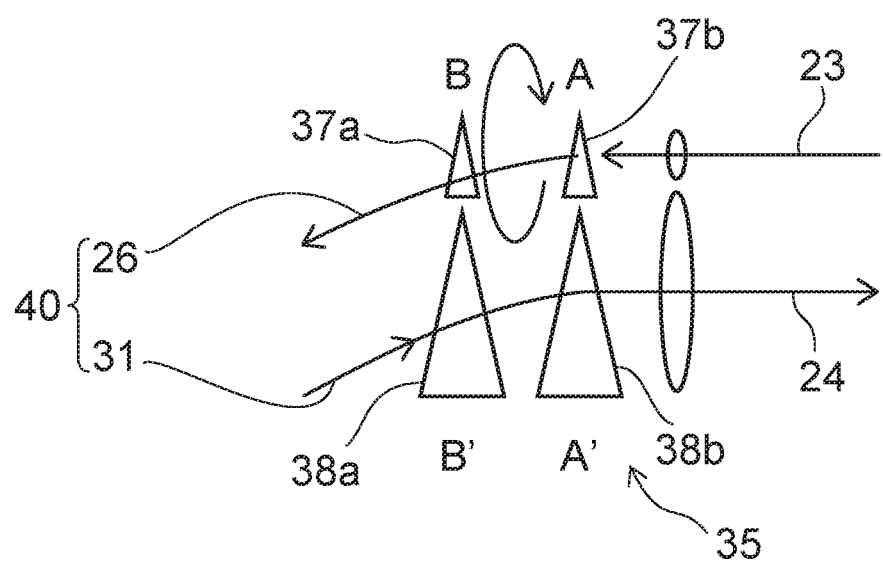
FIG. 4 is an explanatory view of the operation of the optical axis deflection section shown in FIG. 3.

A description will be given of the deflection operation and scan operation of the deflection section 35 with reference to FIG. 4. Note that, for simplification of the description, with regard to the optical prisms 36a and 36b, the prism elements 37a and 37b and the prism elements 38a and 38b are separated and shown in FIG. 4. In addition, FIG. 4 shows a state in which the prism elements 37a and 37b and the prism elements 38a and 38b are positioned in the same direction, and the maximum deflection angle is obtained in this state. In addition, with regard to the minimum deflection angle, one of the optical prisms 36a and 36b is rotated 180°, the optical operations of the optical prisms 36a and 36b are offset, and the deflection angle becomes 0°. Consequently, the measuring light 23 which is emitted via the optical prisms 36a and 36b and the reflected measuring light 24 which is received via the optical prisms 36a and 36b match the reference optical axis O.

The measuring light 23 is emitted from the light emitting element 27, is changed into a parallel light flux by the projecting lens 28, and is emitted toward the object to be measured or the area to be measured through the measuring light deflection section 35a (the prism elements 37a and 37b). Herein, by passing through the measuring light deflection section 35a, the measuring light 23 is deflected in a required direction by the prism elements 37a and 37b, and is emitted. The reflected measuring light 24 reflected from the object to be measured or the area to be measured enters the light reception section 12 through the reflected measuring light deflection section 35b, and is focused on the light receiving element 33 by the image-forming lens 34.

By passing through the reflected measuring light deflection section 35b, the reflected measuring light 24 is deflected by the prism elements 38a and 38b so as to match the received light optical axis 31 (FIG. 4). It is possible to optionally change the deflection direction and deflection angle of the measuring light 23 to be emitted by using a combination of the rotation positions of the optical prism 36a and the optical prism 36b.

Consequently, the calculation control section 19 can perform scanning with the measuring light 23 using a circular locus by controlling the deflection section 35 while causing the light emitting element 27 to emit the laser beam. Note that it will be easily understood that the reflected measuring light deflection section 35b rotates integrally with the measuring light deflection section 35a.

Further, it is possible to acquire distance measurement data (scan data) along a scan locus by executing the distance measurement while consecutively changing the deflection angle of the deflection section 35 to perform scanning with the measuring light 23. With regard to scan conditions determined by a scan speed and a scan density, the scan speed is increased or reduced by maintaining a relationship between the motors 42a and 42b and increasing or decreasing the rotation speeds, and the scan density can be set to a desired value by controlling a relationship between the scan speed and the pulse emission period of the measuring light 23.

In addition, it is possible to detect an emission direction angle of the measuring light 23 at the time of measurement from the rotation angles of the motors 42a and 42b, and it is possible to acquire three-dimensional distance measurement data by associating the emission direction angle at the time of measurement with the distance measurement data. Consequently, it is possible to cause the laser scanner 3 to function as a laser scanner which acquires point group data having three-dimensional position data.

Next, a description will be given of the target device 200 of the present embodiment with reference to the drawings.

Figure 5:
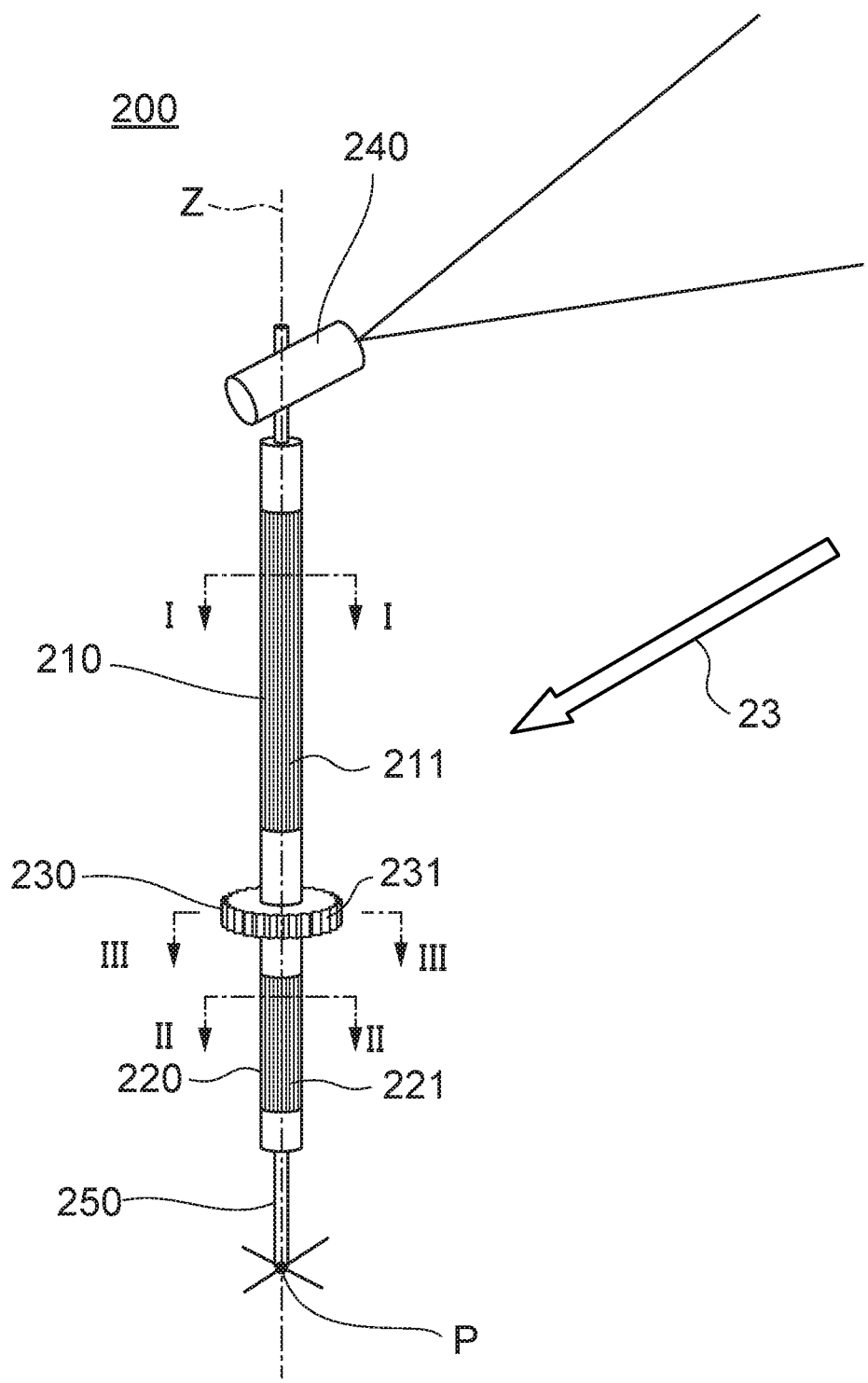
FIG. 5 is an external view of a target device according to the first embodiment of the present invention.
Figure 6:
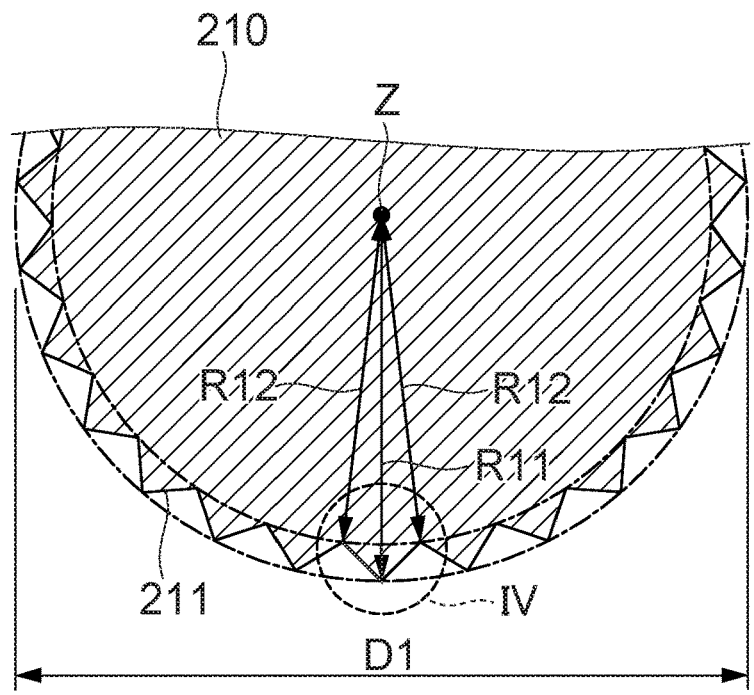
FIG. 6 is a cross-sectional view taken along arrows I-I of the target device shown in FIG. 5.
Figure 7:
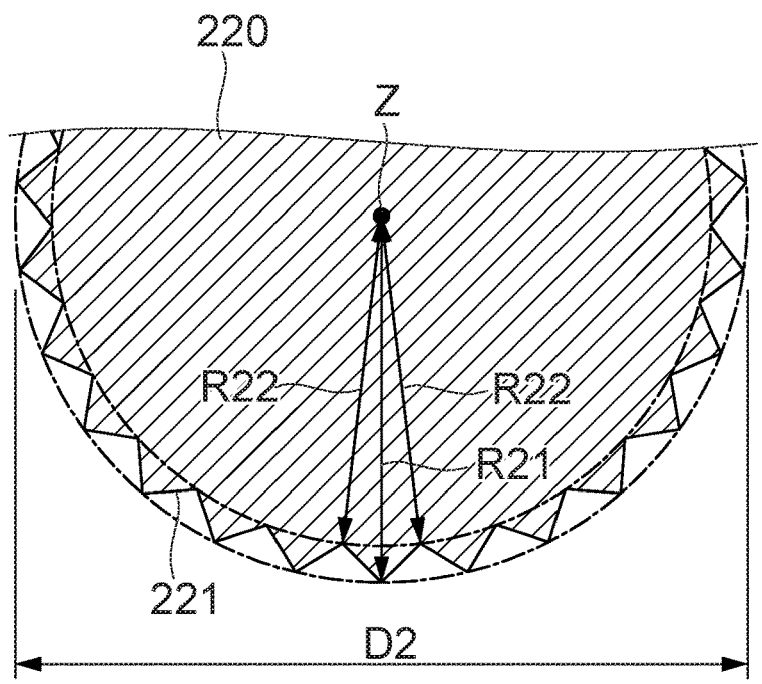
FIG. 7 is a cross-sectional view taken along arrows II-II of the target device shown in FIG.
Figure 8:
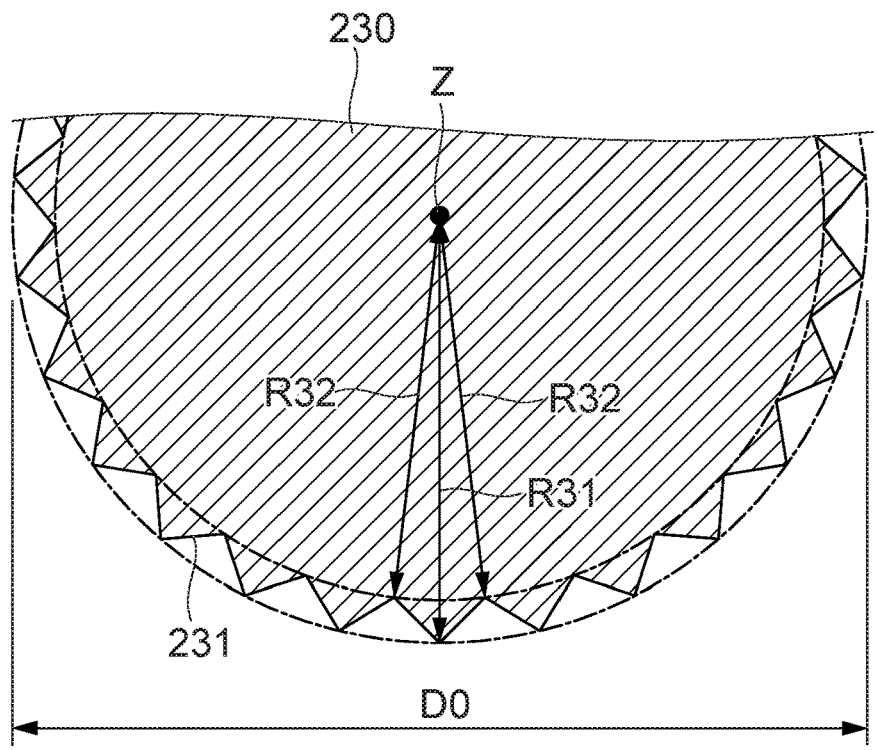
FIG. 8 is a cross-sectional view taken along arrows of the target device shown in FIG. 5.

FIG. 5 is an external view of the target device 200 of the present embodiment. FIG. 6 is a cross-sectional view taken along arrows I-I of the target device 200 shown in FIG. 5. FIG. 7 is a cross-sectional view taken along arrows II-II of the target device 200 shown in FIG. 5. FIG. 8 is a cross-sectional view taken along arrows of the target device 200 shown in FIG. 5.

The target device 200 is an object to be measured which is placed at a measuring point P, is substantially in the shape of a solid of revolution about an axis Z, and is measured with the measuring light 23 emitted by the measuring device 100. The target device 200 includes a first auxiliary measurement section 210, a second auxiliary measurement section 220, a reference measurement section 230, an illumination lamp 240, and a pole 250. The first auxiliary measurement section 210, the second auxiliary measurement section 220, and the reference measurement section 230 function as a measurement section serving as a measurement target measured by the measuring device 100.

The first auxiliary measurement section 210 is a long object to be measured extending along the axis Z and has a substantially cylindrical shape about the axis Z. As shown in FIG. 6, the first auxiliary measurement section 210 has an outer diameter D1 (a first outer diameter) about the axis Z. The first auxiliary measurement section 210 may be substantially in the shape of a solid of revolution about the axis Z (e.g., a conical shape) instead of having the substantially cylindrical shape.

A retroreflective layer 211 is formed on part of the outer peripheral surface of the first auxiliary measurement section 210. The retroreflective layer 211 is a layer in which a plurality of retroreflective elements are arranged on the entire circumference in a circumferential direction about the axis Z. As shown in FIG. 6, the retroreflective layer 211 is formed into an uneven shape in which a distance from the axis Z changes cyclically along the entire circumference in the circumferential direction about the axis Z. As shown in FIG. 6, the uneven shape of the retroreflective layer 211 is a shape in which a peak having the distance from the axis Z corresponding to R11 and a valley having the distance from the axis Z corresponding to R12 which is less than R11 are formed cyclically.

It is assumed that, in the first auxiliary measurement section 210, the retroreflective layer 211 is formed on part of the outer peripheral surface in a direction of the axis Z in the above description, but the retroreflective layer 211 may also be formed on the entire area of the outer peripheral surface. That is, in the first auxiliary measurement section 210, it is preferable to form the retroreflective layer 211 on at least part of the outer peripheral surface in the direction of the axis Z.

The second auxiliary measurement section 220 is a long object to be measured extending along the axis Z and has a substantially cylindrical shape about the axis Z. As shown in FIG. 7, the second auxiliary measurement section 220 has an outer diameter D2 (a second outer diameter) about the axis Z. The second auxiliary measurement section 220 may be substantially in the shape of a solid of revolution about the axis Z (e.g., a conical shape) instead of having the substantially cylindrical shape.

A retroreflective layer 221 is formed on part of the outer peripheral surface of the second auxiliary measurement section 220. The retroreflective layer 221 is a layer in which a plurality of retroreflective elements are arranged on the entire circumference in the circumferential direction about the axis Z. As shown in FIG. 7, the retroreflective layer 221 is formed into an uneven shape in which a distance from the axis Z changes cyclically along the entire circumference in the circumferential direction about the axis Z. As shown in FIG. 7, the uneven shape of the retroreflective layer 221 is a shape in which a peak having the distance from the axis Z corresponding to R21, and a valley having the distance from the axis Z corresponding to R22 which is less than R21 are formed cyclically.

It is assumed that, in the second auxiliary measurement section 220, the retroreflective layer 221 is formed on part of the outer peripheral surface in the direction of the axis Z in the above description, but the retroreflective layer 221 may also be formed on the entire area of the outer peripheral surface. That is, in the second auxiliary measurement section 220, it is preferable to form the retroreflective layer 221 on at least part of the outer peripheral surface in the direction of the axis Z.

The reference measurement section 230 is an object to be measured which is disposed between the first auxiliary measurement section 210 and the second auxiliary measurement section 220 in an axial direction along the axis Z, and has a substantially cylindrical shape. As shown in FIG. 8, the reference measurement section 230 has an outer diameter D0 (a predetermined outer diameter) about the axis Z. As shown in FIG. 5, the outer diameter D0 is greater than each of the outer diameter D1 and the outer diameter D2. The outer diameter D1 and the outer diameter D2 may be equal to each other.

The reference measurement section 230 may be substantially in the shape of a solid of revolution about the axis Z instead of having the substantially cylindrical shape. For example, the reference measurement section 230 may have a substantially conical shape in which the outer diameter gradually increases from a lower end toward an upper end in a direction along the axis Z. In addition, the reference measurement section 230 may also have a shape in which the outer diameter gradually increases from the lower end in the direction along the axis Z and the outer diameter then gradually decreases toward the upper end (a shape obtained by combining two substantially conical structures).

A retroreflective layer 231 is formed on the outer peripheral surface of the reference measurement section 230. The retroreflective layer 231 is a layer in which a plurality of retroreflective elements are arranged on the entire circumference in the circumferential direction about axis Z. As shown in FIG. 8, the retroreflective layer 231 is formed into an uneven shape in which a distance from the axis Z changes cyclically along the entire circumference in the circumferential direction about the axis Z. As shown in FIG. 8, the uneven shape of the retroreflective layer 231 is a shape in which a peak having the distance from the axis Z corresponding to R31 and a valley having the distance from the axis Z corresponding to R32 which is less than R31 are formed cyclically.

It is assumed that, in the reference measurement section 230, the retroreflective layer 231 is formed on the entire area of the outer peripheral surface in the direction of the axis Z in the above description, but the retroreflective layer 231 may also be formed on part of the outer peripheral surface. That is, in the reference measurement section 230, it is preferable to form the retroreflective layer 231 on at least part of the outer peripheral surface in the direction of the axis Z.

Figure 9:
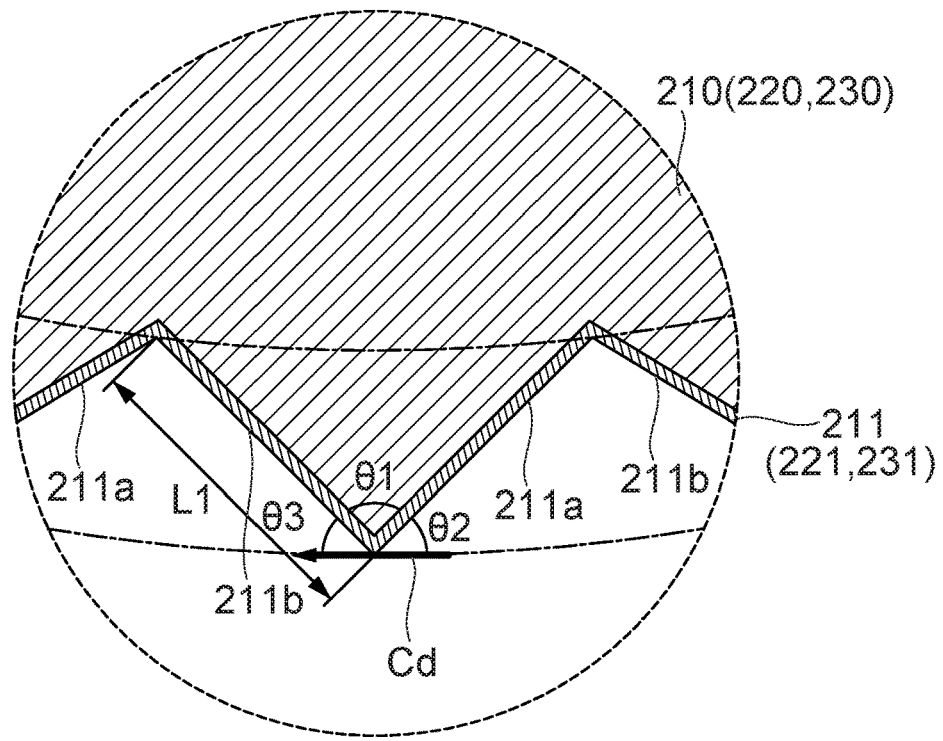
FIG. 9 is a partially enlarged view of an IV portion of a first auxiliary measurement section shown in FIG. 6.
Figure 10:
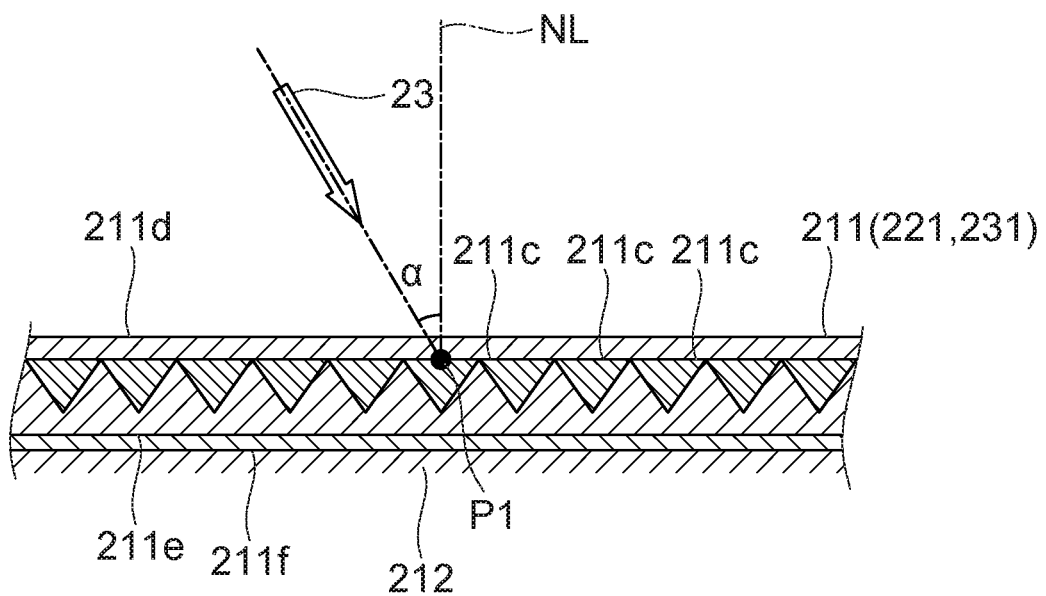
FIG. 10 is a cross-sectional view showing a retroreflective layer.

Herein, the retroreflective layer 211 of the first auxiliary measurement section 210, the retroreflective layer 221 of the second auxiliary measurement section 220, and the retroreflective layer 231 of the reference measurement section 230 will be described in greater detail. FIG. 9 is a partially enlarged view of a IV portion of the first auxiliary measurement section 210 shown in FIG. 6. FIG. 10 is a cross-sectional view showing the retroreflective layer 211.

Hereinbelow, a description will be given of the first auxiliary measurement section 210 and the retroreflective layer 211 of the first auxiliary measurement section 210. Note that each of the retroreflective layer 221 of the second auxiliary measurement section 220 and the retroreflective layer 231 of the reference measurement section 230 is similar to the retroreflective layer 211, and hence the description thereof will be omitted in the following description.

In FIG. 9, a circumferential direction Cd is a direction of a tangent to a circle having the outer diameter D1 about the axis Z as its diameter, and is a clockwise direction about the axis Z. The retroreflective layer 211 has a plurality of first areas 211a in each of which the distance from the axis Z gradually increases along the circumferential direction Cd from R12 to R11, and a plurality of second areas 211b in each of which the distance from the axis Z gradually decreases along the circumferential direction Cd from R11 to R12.

Each of the first areas 211a and each of the second areas 211b are flat surfaces which are formed so as to extend parallel to the axis Z. The first areas 211a and the second areas 211b are formed at regular intervals over the entire circumference of the retroreflective layer 211 along the circumferential direction Cd. The first area 211a and the second area 211b are disposed adjacent to each other along the circumferential direction Cd, and are formed alternately over the entire circumference of the retroreflective layer 211. The length of each of the first area 211a and the second area 211b corresponds to L1, and is set to, e.g., 0.5 mm or more and 2.0 mm or less.

At the peak which has the distance from the axis Z corresponding to R11, an angle formed by the first area 211a and the second area 211b on an inner side (a side of the axis Z) is θ1. θ1 is set to about 90 degrees (e.g., in a range of 85 degrees or more and 95 degrees or less). An angle which the first area 211a forms with the circumferential direction Cd is θ2, and an angle which the second area 211b forms with the circumferential direction Cd is θ3. θ2 and θ3 are equal to each other, and each of θ2 and θ3 corresponds to ½ of a value obtained by subtracting θ1 from 180 degrees. For example, in the case where θ1 is equal to or less than 90 degrees, each of θ2 and θ3 is not less than 45 degrees.

As shown in FIG. 10, the retroreflective layer 211 includes a plurality of retroreflective elements 211c in each of which an incident surface is disposed parallel to an outer peripheral surface on which the measuring light 23 incidents, a protective layer 211d which protects the incident surface of the retroreflective element 211c, a filling layer 211e with which the back surface side of the retroreflective element 211c is filled, and a bonding layer 211f which is used for bonding the retroreflective layer 211 to a main body portion 212 of the first auxiliary measurement section 210.

The retroreflective layer 211 in which the plurality of first areas 211a and the plurality of second areas 211b are alternately disposed is formed by folding one sheet material in which the retroreflective elements 211c are arranged.

In the retroreflective layer 211, the plurality of retroreflective elements 211c are continuously arranged with no gap on the entire circumference in the circumferential direction Cd and in the entire area in a direction parallel to the axis Z. The retroreflective element 211c is an element which has a shape corresponding to one corner of a cube, and has three surfaces which are orthogonal to each other and the incident surface which intersects the three surfaces. In the retroreflective element 211c, the length of one side of the incident surface in the shape of an equilateral triangle is set to, e.g., 100 μm.

As shown in FIG. 10, at a point of incidence P1 at which the measuring light 23 incidents on the incident surface of the retroreflective element 211c, an angle which the measuring light 23 forms with a normal NL to the incident surface is an incident angle α. In the following description, the angle which the measuring light 23 forms with the normal to the incident surface of the retroreflective element is referred to as the incident angle.

Figure 11:
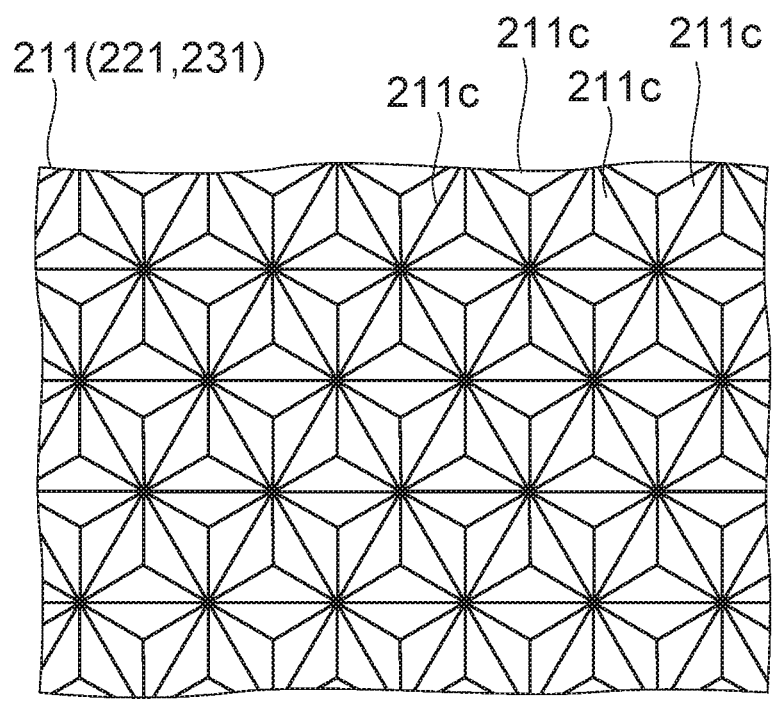
FIG. 11 is a plan view of the retroreflective layer when viewed from the side of an incident surface of a retroreflective element.

As shown in FIG. 11, the retroreflective layer 211 is a layer in which the plurality of retroreflective elements 211c each of which has the incident surface in the shape of an equilateral triangle are arranged with no gap such that the incident surface is disposed the side of the outer peripheral surface. Each of the plurality of retroreflective elements 211c reflects the measuring light 23.

Figure 12:
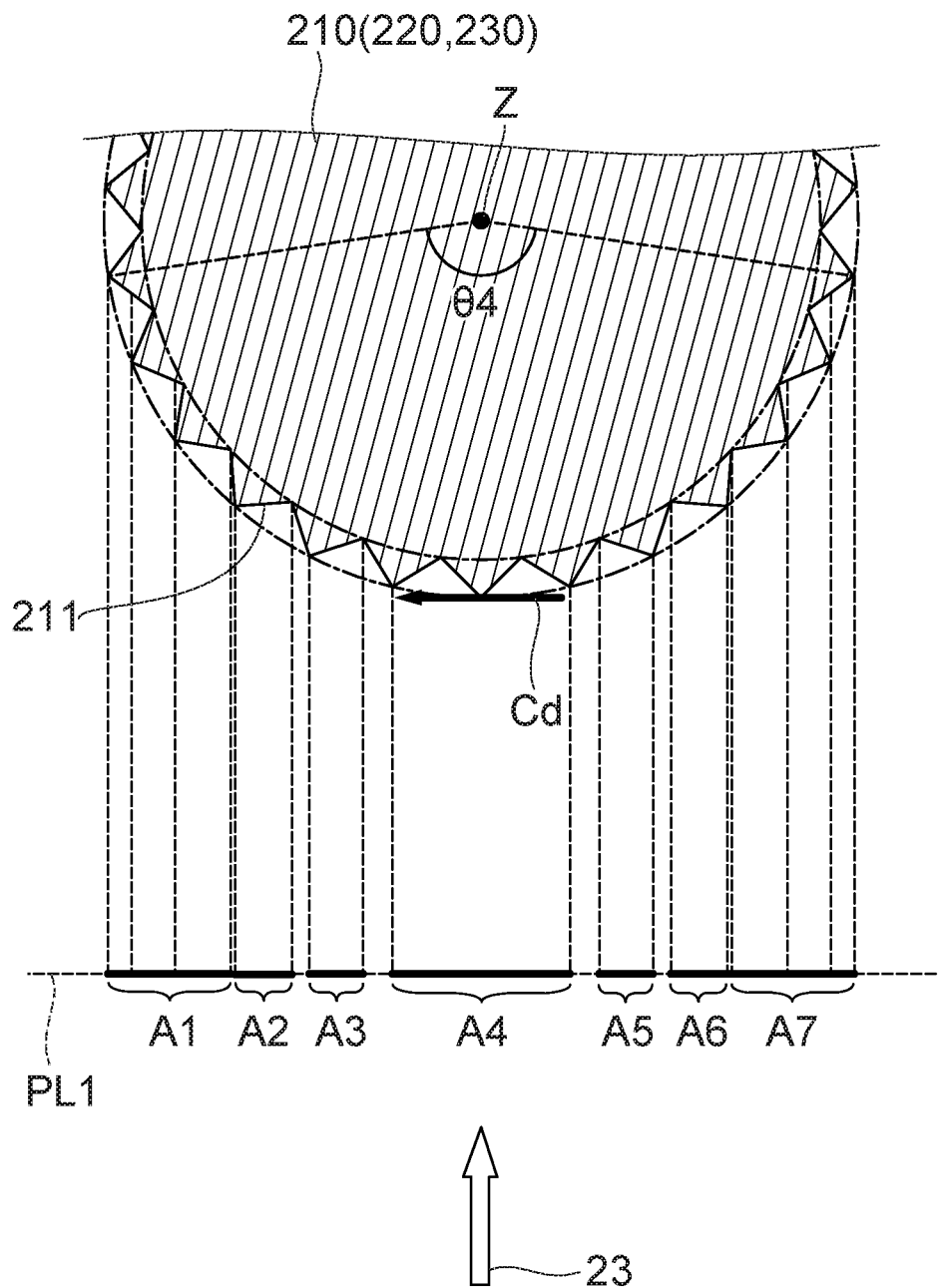
FIG. 12 is a view showing an area through which reflected light reflected from the retroreflective layer of the first embodiment passes.
Figure 13:
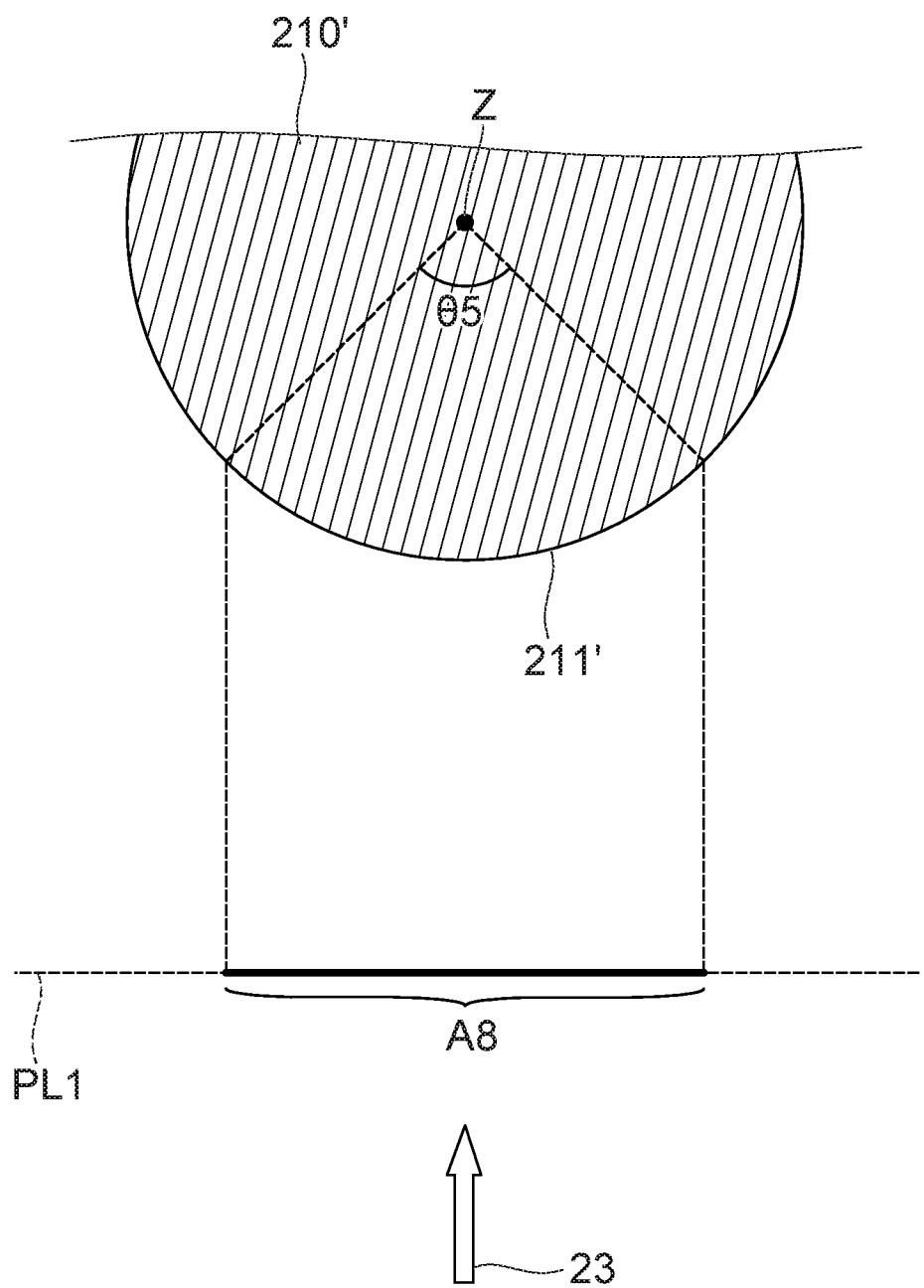
FIG. 13 is a view showing an area through which reflected light reflected from a retroreflective layer of a comparative example passes.

Herein, a description will be given of an area through which reflected light reflected from the retroreflective layer 211 passes in the case where the measuring light 23 is applied to the retroreflective layer 211 of the first auxiliary measurement section 210 of the present embodiment. FIG. 12 is a view showing the area through which the reflected light reflected from the retroreflective layer 211 of the first embodiment passes. FIG. 12 corresponds to the cross-sectional view taken along the I-I arrows of the target device 200 shown in FIG. 5. FIG. 13 is a view showing an area through which reflected light reflected from a retroreflective layer 211' of a comparative example passes.

As shown in FIG. 12, the retroreflective layer 211 of the present embodiment forms the uneven shape along the circumferential direction Cd. Consequently, the retroreflective layer 211 emits the reflected light from the incident surface having the incident angle of the measuring light 23 of not more than a predetermined angle and does not emit the reflected light from the incident surface having the incident angle of the measuring light 23 of more than the predetermined angle. Herein, the predetermined angle is an angle in a range of, e.g., 45 degrees or more and 60 degrees or less, and denotes an angle set based on characteristics of the retroreflective layer 211. As indicated by the range of 45 degrees or more and 60 degrees or less mentioned above as an example, the predetermined angle which determines whether or not the reflected light is emitted from the incident surface is not fixed because the above-described predetermined angle changes depending on the direction about the normal to the incident surface from which the measuring light incidents.

As the result of reflection of the measuring light 23 by the retroreflective layer 211, the areas of the reflected light which passes through a plane PL1 extending parallel to the axis Z correspond to A1, A2, A3, A4, A5, A6, and A7 shown in FIG. 12. In the case where lines are drawn from both ends (the left end of A1 and the right end of A7) of the areas through which the reflected light passes to the axis Z, an angle formed by the lines is θ4. θ4 is an angle which is equal to or less than 180 degrees and is close to 180 degrees.

On the other hand, the retroreflective layer 211' of the comparative example is disposed equidistant from the axis Z along the circumferential direction Cd, and the outer peripheral surface of its cross section is formed into a circular shape over the entire circumference. Herein, except that the outer peripheral surface is formed into the circular shape, the retroreflective layer 211' of the comparative example has the same characteristics as those of the retroreflective layer 211 of the present embodiment. Consequently, the retroreflective layer 211' emits the reflected light from the incident surface having an angle formed with respect to the measuring light 23 which is equal to or less than a predetermined angle, and does not emit the reflected light from the incident surface having the angle formed with respect to the measuring light 23 which is greater than the predetermined angle.

As a result, the area of the reflected light which passes through a plane PL1 extending parallel to the axis Z corresponds to A8 shown in FIG. 13. In the case where lines are drawn from both ends (the left end of A8 and the right end of A8) of the area through which the reflected light passes to the axis Z, an angle formed by the lines is θ5. θ5 is an angle which is twice the above-described predetermined angle which determines whether or not the reflected light is emitted from the incident surface.

Thus, the retroreflective layer 211 of the present embodiment emits the reflected light from the substantially entire area to which the measuring light 23 is applied and which includes the end portions of the first auxiliary measurement section 210 (the area corresponding to θ4). On the other hand, the retroreflective layer 211' of the comparative example emits the reflected light from part of the area to which the measuring light 23 is applied and which does not include the end portion of the first auxiliary measurement section 210 (the area corresponding to θ5). Therefore, as compared with the retroreflective layer 211' of the comparative example in which the uneven shape is not formed, the retroreflective layer 211 of the present embodiment can emit the reflected light from the wide area including the end portions of the target device 200.

The illumination lamp 240 is connected to the upper end of the first auxiliary measurement section 210 via a universal coupler (not shown). The illumination lamp 240 emits illumination light and causes the measuring device 100 to recognize the position of the target device 200. The measuring device 100 recognizes a distance from the reference measurement section 230 to the illumination lamp 240 along the axis Z as a known distance. The universal coupler can set a direction in which the illumination lamp 240 emits the illumination light to any direction with respect to the first auxiliary measurement section 210. A radiation angle of the illumination light of the illumination lamp 240 is, e.g., substantially 30 degrees, and it is preferable to be able to reduce the radiation angle to about 10 degrees using a zoom mechanism.

The pole 250 is a stick-like member which is coupled to the lower end of the second auxiliary measurement section 220, and is formed so as to extend along the axis Z. The outer diameter of the pole 250 is less than the outer diameter D2 of the second auxiliary measurement section 220. The lower end of the pole 250 serves as the measuring point P of the target device 200 which is measured by the measuring device 100. The measuring device 100 recognizes a distance from the reference measurement section 230 to the lower end of the pole 250 along the axis Z as a known distance.

Figure 14:
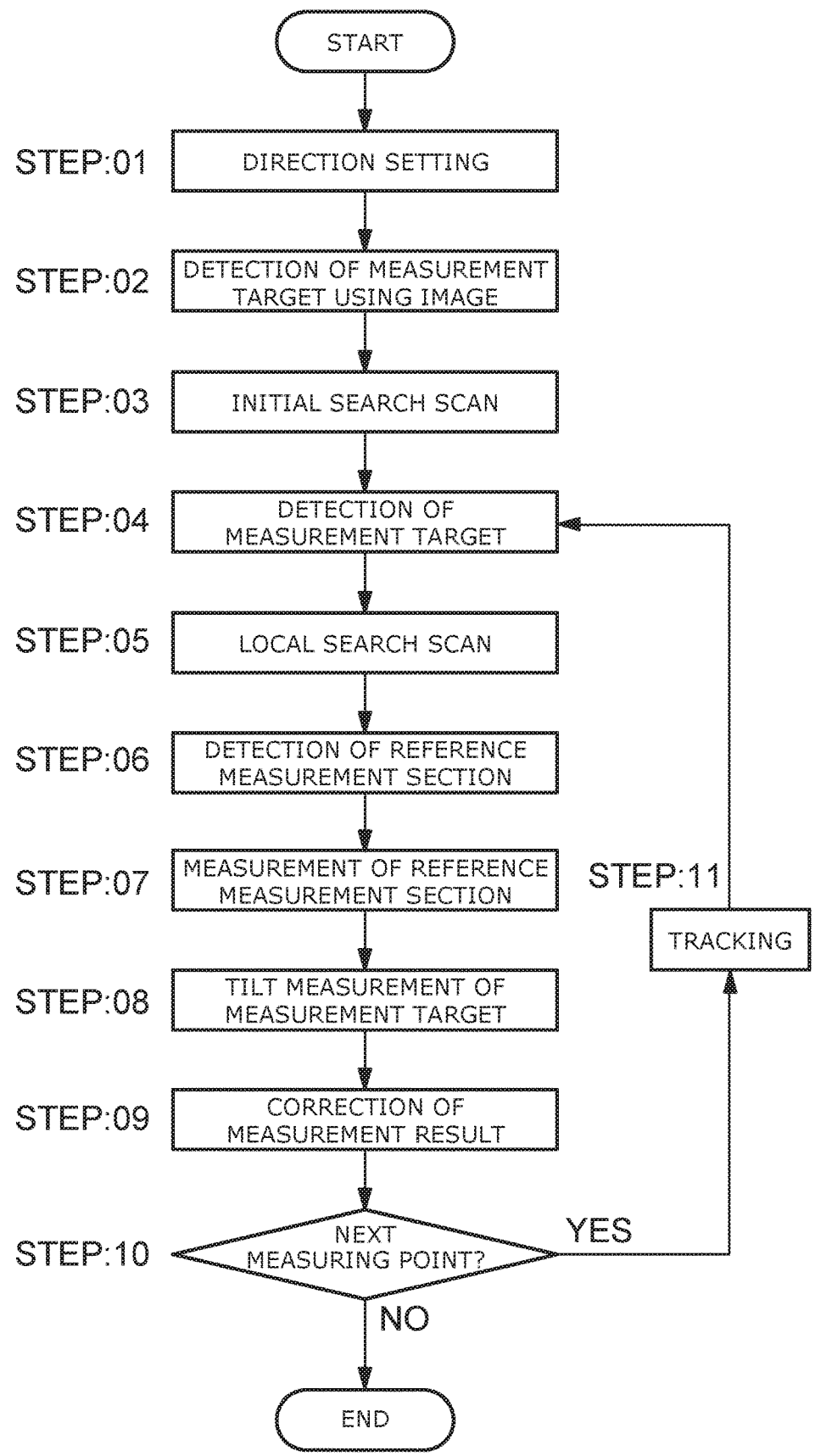
FIG. 14 is a flowchart showing processing executed by a measuring device.
Figure 15:
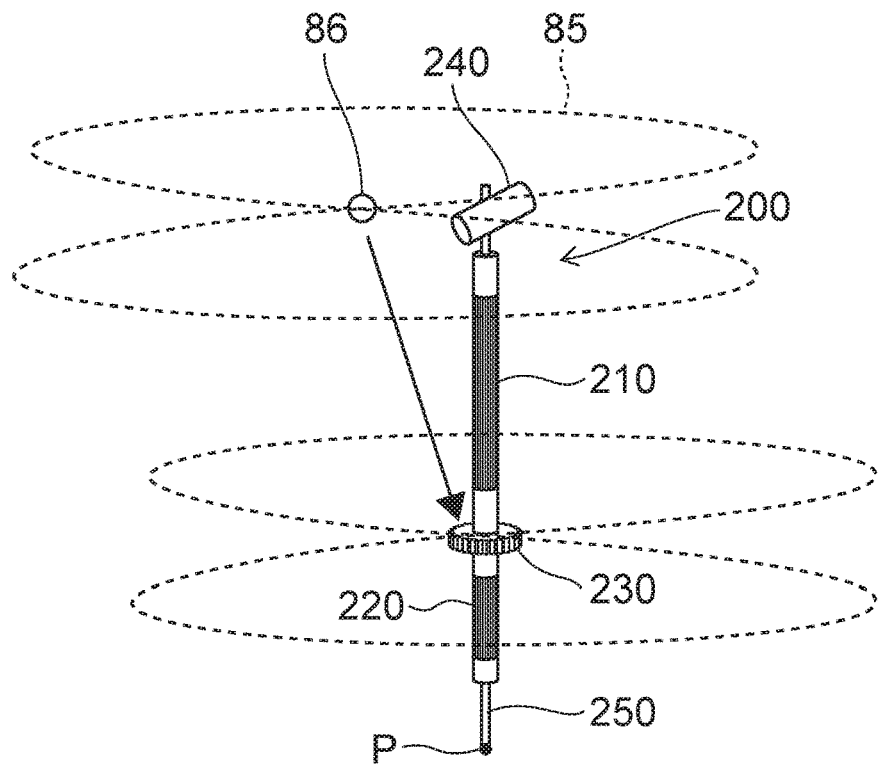
FIG. 15 is an explanatory view showing a relationship between a scan pattern and a measurement target.
Figure 16:
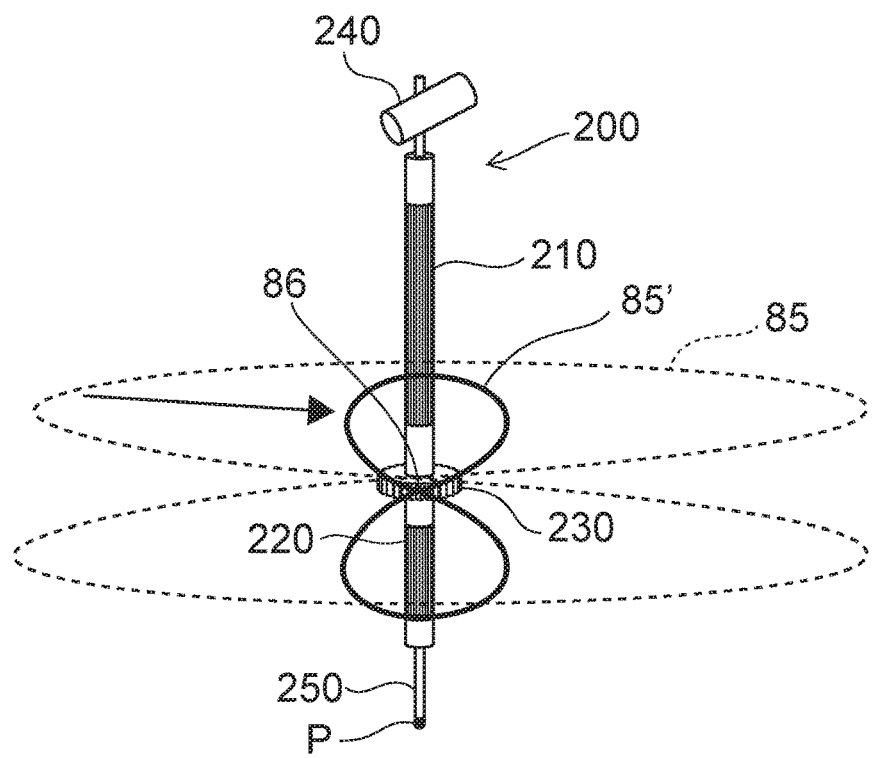
FIG. 16 is an explanatory view showing a relationship among the scan pattern, a local scan pattern, and the measurement target.
Figure 17:
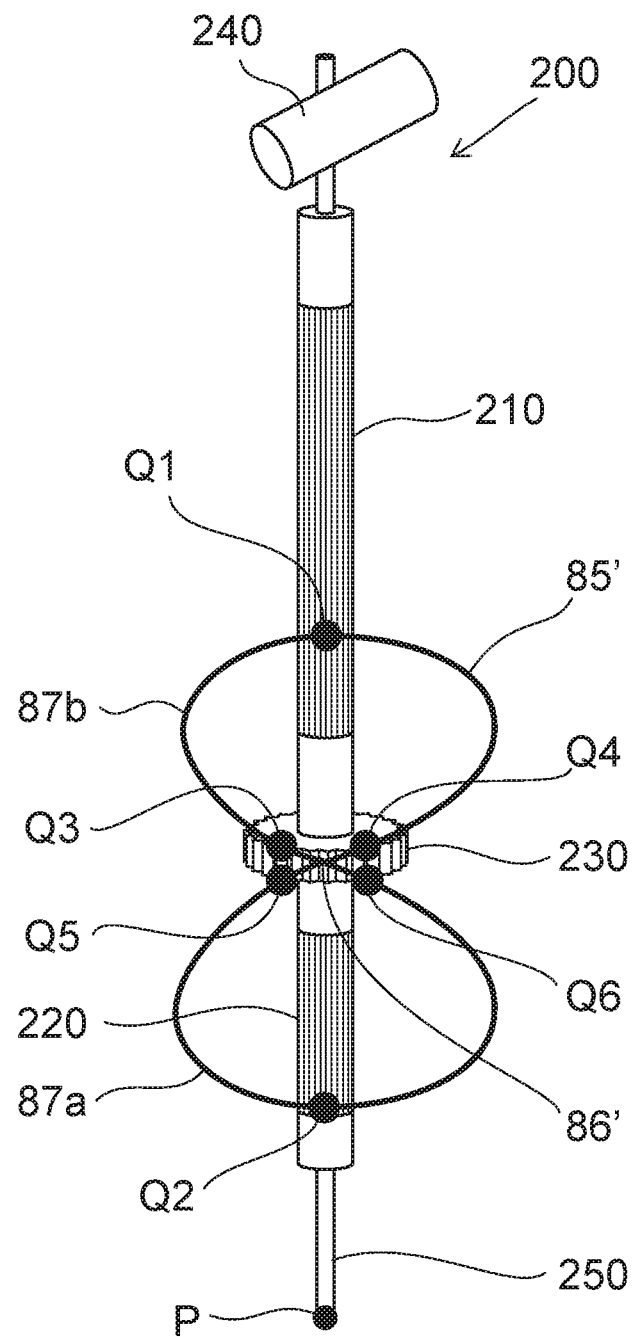
FIG. 17 is an explanatory view showing detection of a reference measurement section by the local scan pattern and detection of tilt of the target device.

Next, a description will be given of measurement processing executed by the measuring device 100 of the present embodiment with reference to FIG. 14 and FIG. 15. FIG. 14 is a flowchart showing the processing executed by the measuring device 100 of the present embodiment. FIG. 15 is an explanatory view showing a relationship between a scan pattern and a measurement target. FIG. 16 is an explanatory view showing a relationship among the scan pattern, a local scan pattern, and the measurement target. FIG. 17 is an explanatory view showing detection of the reference measurement section by the local scan pattern, and detection of tilt of the target device.

A measurement operation in the present embodiment can be executed by a single worker. The worker places the target device 200 at the measuring point P. The measuring device 100 detects the attitude of the measuring device 100 using the attitude detection section 17 when the measuring device 100 measures the target device 200. Consequently, the worker does not need to perform a leveling operation of the measuring device 100. The worker sets a direction of collimation of the measuring device 100 such that the target device 200 comes into sight.

The worker directs the illumination lamp 240 in the direction of the measuring device 100 and turns on the illumination lamp 240. The radiation angle of the illumination light of the illumination lamp 240 is substantially 30°, which is a wide radiation angle, and hence it is possible to apply the illumination light to the measuring device 100 by roughly setting the direction of the illumination lamp 240 such that the direction of the illumination lamp 240 matches the direction of the measuring device 100 (STEP:01).

The imaging control section 21 of the measuring device 100 acquires the image of the illumination lamp 240 using the imaging section 14 according to a command to start measurement. The angle of view of the imaging section 14 is 50°, which is a wide angle of view, and hence it is possible to reliably capture the illumination light of the illumination lamp 240 only by roughly directing the measuring device 100 in the direction of the measuring point P.

The calculation control section 19 of the measuring device 100 calculates the position of the illumination lamp 240 (the center of the illumination light) from the image captured by the imaging section 14. Further, the calculation control section 19 calculates the direction (the horizontal angle and the vertical angle) of the reference measurement section 230 from a known positional relationship between the illumination lamp 240 and the reference measurement section 230. Based on the calculation result, the calculation control section 19 controls a horizontal rotation section (not shown) and a vertical rotation section (not shown) to direct the reference optical axis O of the measuring device 100 to the reference measurement section 230. In a state in which the reference optical axis O is directed to the reference measurement section 230, the reference measurement section 230 of the target device 200 is positioned substantially at the center of the image captured by the imaging section 14 (STEP:02).

The measuring device 100 emits the measuring light 23 from the measuring light emission section 11, controls the rotations of the optical prisms 36a and 36b, and performs a two-dimensional search scan of the vicinity of the reference measurement section 230 based on the obtained direction (the horizontal angle and the vertical angle) of the reference measurement section 230. The two-dimensional search scan includes an initial search scan having a wide search area, and a local search scan having a search area which is limited to a narrow area including the reference measurement section 230 serving as the measurement target.

The measuring device 100 executes the initial search scan for detecting the target device 200 first. After the target device 200 is detected, the measuring device 100 executes the local search scan. The search scan to be executed herein requires only the rotations of the optical prisms 36a and 36b which are small in mass, and hence it is possible to perform the search scan at extremely high speed (STEPs:03 to 05).

In the following description, a figure-eight shaped scan pattern 85 is used as the pattern of the search scan. As shown in FIG. 15, the shape of the scan pattern 85 in the initial search scan at the time of start of the search has a figure-eight shape which is flat in the horizontal direction. The first auxiliary measurement section 210 is long in the vertical direction, and hence a high-speed search in a wide area is possible by flattening the scan pattern 85.

The measuring device 100 executes distance measurement and angle measurement in addition to the execution of the scan pattern 85, and hence it is possible to immediately measure the position of the first auxiliary measurement section 210 in the horizontal direction based on the reflected measuring light 24 from the first auxiliary measurement section 210. Consequently, a state in which the path of the scan pattern 85 of the initial search scan intersects the first auxiliary measurement section 210 is obtained by execution of the scan pattern 85, and the position of the target device 200 in the horizontal direction is detected (STEP:03).

The calculation control section 19 controls the emitted light optical axis deflection section based on the measurement result and, thereafter, the calculation control section 19 moves an intersection point 86 along the first auxiliary measurement section 210 until the reference measurement section 230 is detected with the scan pattern 85 (in FIG. 15, the intersection point 86 is moved downward) (STEP:04).

In the case where the reference measurement section 230 is detected with the scan pattern 85, the measuring device 100 changes the scan pattern 85 to a local scan pattern 85' suitable for detection of the center position of the reference measurement section 230 (see FIG. 16). The local scan pattern 85' has a narrow search area and is vertically long. Herein, the reference measurement section 230 protrudes outwardly of the first auxiliary measurement section 210, and hence it is possible to determine the detection of the reference measurement section 230 based on the change of the result of the distance measurement.

FIG. 17 shows a state in which the local search scan is executed with the local scan pattern 85' (STEP:05). When an intersection point 86' of the local scan pattern 85' is positioned in the vicinity of the center of the reference measurement section 230, a scan first half 87a and a scan second half 87b of the local scan pattern 85' pass the edge of the reference measurement section 230. It is possible to measure the position of the intersection point 86' with respect to the reference measurement section 230 by using measurement results of measuring points Q3, Q4, Q5, and Q6 of the edge, and cause the intersection point 86' to match the center of the reference measurement section 230 (STEP:06).

When the intersection point 86' matches the center of the reference measurement section 230, the measurement of the reference measurement section 230 is executed (STEP:07). Further, by execution of the local scan pattern 85', the positions (three-dimensional coordinates) of measuring points Q1 and Q2 of the first auxiliary measurement section 210 and the second auxiliary measurement section 220 are measured. By using the three-dimensional coordinates of the measuring points Q1 and Q2, it is possible to measure the tilt of the target device 200 in each of a front and rear direction and a left and right direction.

With this, it is possible to correct the measurement result of the reference measurement section 230 based on the three-dimensional coordinates of the measuring points Q1 and Q2. The measuring device 100 detects the position (three-dimensional coordinates) of the measuring point P of the target device 200 by correcting the measurement result of the reference measurement section 230 (STEPs:08,09). Consequently, even in the case of the measurement at a place where the target device 200 cannot be erected and held such as, e.g., a corner on a wall or a corner in a ceiling, when the measuring point P can be indicated by the lower end of the pole 250, accurate measurement can be performed.

Next, the presence or absence of the measuring point to be measured is determined (STEP:10). In the case where the target device 200 is moved to the next measuring point P, when the scan pattern 85 is continuously executed during the movement, it is possible to track the target device 200. According to the present embodiment, it is only required that the scan pattern 85 crosses the first auxiliary measurement section 210 during the movement of the target device 200, and hence the tracking is easily and reliably executed. Further, even in the case where an obstacle passes between the measuring device 100 and the target device 200 and the tracking is suspended, it is possible to easily resume the tracking (STEP:11).

A description will be given of the operation and effect achieved by the target device 200 of the present embodiment described above.

According to the target device 200 of the present embodiment, the outer diameter D0 of the reference measurement section 230 is greater than each of the outer diameters D1 and D2 of the first auxiliary measurement section 210 and the second auxiliary measurement section 220. Consequently, the measuring device 100 can detect the position of the reference measurement section 230 which is larger in outer diameter than each of the first auxiliary measurement section 210 and the second auxiliary measurement section 220, and measure the measuring point P (the tip of the target device) which is disposed the known distance away from the reference measurement section 230 by applying the measuring light 23 to the target device 200 and receiving the reflected measuring light 24.

In addition, the measuring device 100 can measure the tilt of the axis Z of the target device 200 with respect to the distance measuring light optical axis of the measuring light 23 and correct the measurement result of the measuring point P by detecting the positions of the first auxiliary measurement section 210 and the second auxiliary measurement section 220. Therefore, even when the target device 200 is not erected vertically, it is possible to directly measure the position of the measuring point P using the measuring device 100.

Further, according to the target device 200 of the present embodiment, the retroreflective layer 211, 221, or 231 is formed into the uneven shape in which the distance from the axis Z changes along the entire circumference in the circumferential direction Cd. Consequently, in part of the retroreflective layer 211, 221, or 231 disposed at the end portion of the target device 200 in the width direction, the incident angle which the measuring light forms with the normal to the incident surface of the retroreflective element is equal to or less than the predetermined angle (e.g., the angle in the range of 45 degrees or more and 60 degrees or less). With this, it becomes possible to obtain a sufficient amount of reflected light from the end portion of the target device 200.

In addition, according to the target device 200 of the present embodiment, the retroreflective layer 211 has the plurality of first areas 211a and the plurality of second areas 211b. With regard to the measuring light 23 which incidents on the first area 211a and the second area 211b disposed at each end portion of the target device 200 in the width direction when viewed from the measuring device 100, an angle which the measuring light 23 forms with the incident surface of the retroreflective element 211c is not less than a predetermined angle (e.g., 45 degrees or more), and hence the incident angle which the measuring light 23 forms with the normal to the incident surface is sufficiently reduced, and it is possible to reliably obtain a sufficient amount of the reflected measuring light 24 from the end portion of the target device 200.

Further, according to the target device 200 of the present embodiment, each of the first area 211a and the second area 211b is the surface which is formed so as to extend parallel to the axis Z, and hence the same reflected measuring light 24 is reflected from the target device 200 irrespective of the position of the retroreflective layer 211, 221, or 231 along the axis on which the measuring light 23 incidents. In addition, the first areas 211a and the second areas 211b are formed at regular intervals along the circumferential direction Cd, and hence the same reflected measuring light 24 can be reflected toward the measuring device 100 from the target device 200 irrespective of the direction about the axis Z in which the target device 200 is disposed.

Further, according to the target device 200 of the present embodiment, each of the first area 211a and the second area 211b is the flat surface, and hence the reflected measuring light 24 is reflected from the entire area on which the measuring light 23 incidents in each flat surface. In addition, the flat surfaces of the first area 211a and the second area 211b are disposed adjacent to each other, and hence it is possible to bring the areas from which the reflected measuring light 24 is reflected close to each other.

Second Embodiment

Next, a description will be given of a surveying system according to a second embodiment of the present invention. The present embodiment is a modification of the first embodiment, and it is assumed that the present embodiment is similar to the first embodiment except a case specifically described below. In the surveying system of the first embodiment, the uneven shape of the retroreflective layer 211, 221, or 231 of the target device 200 is formed of the flat surfaces (the first area 211a, the second area 211b) having the angles θ2 and θ3 which the flat surfaces form with the circumferential direction Cd which are not less than the predetermined angle (e.g., 45 degrees). In contrast to this, in the surveying system of the present embodiment, an uneven shape of a retroreflective layer 211A, 221A, or 231A of the target device 200 is formed of a curved surface including an area in which an angle which the curved surface forms with the circumferential direction Cd is not less than a predetermined angle (e.g., 45 degrees).

Hereinbelow, a description will be given of a first auxiliary measurement section 210A of the present embodiment and the retroreflective layer 211A of the first auxiliary measurement section 210A. Note that each of the retroreflective layer 221A of a second auxiliary measurement section 220A and the retroreflective layer 231A of a reference measurement section 230A is similar to the retroreflective layer 211A, and hence the description thereof will be omitted in the following description.

Figure 18:
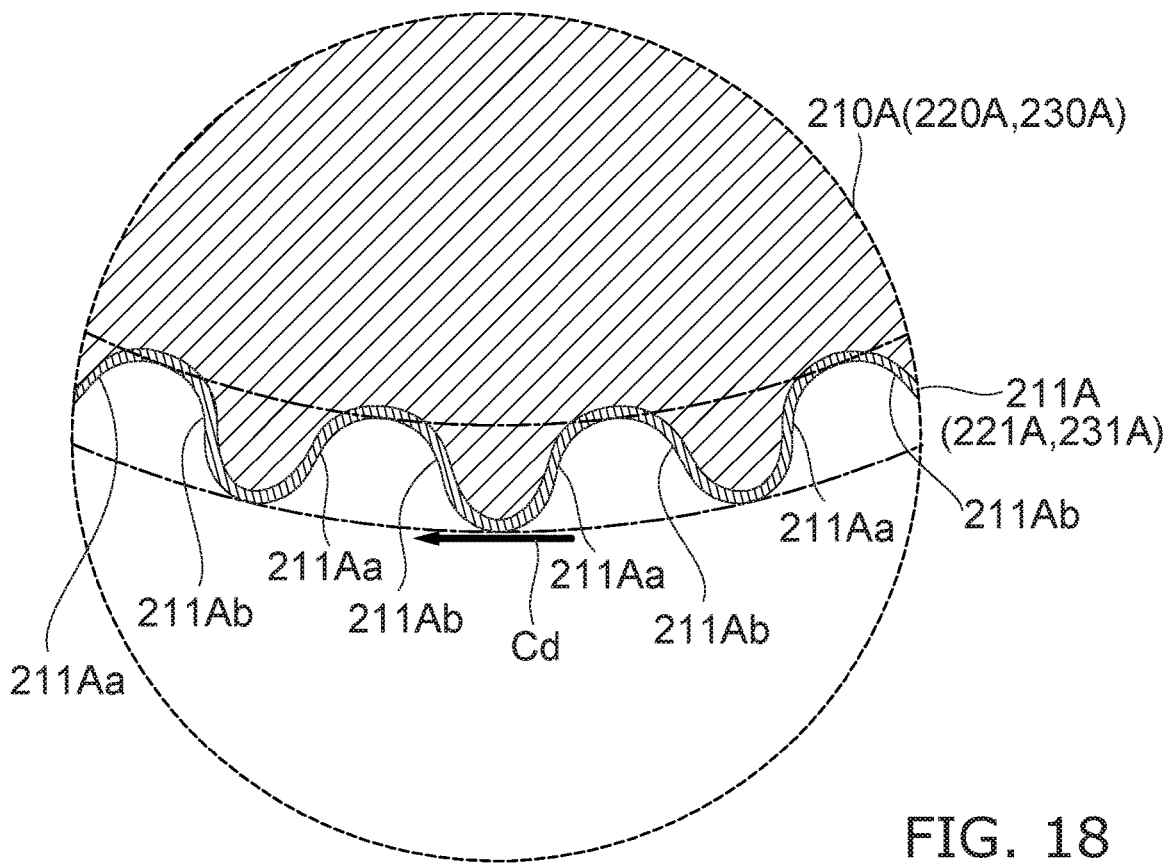
FIG. 18 is a partially enlarged view showing a first auxiliary measurement section of a second embodiment.

FIG. 18 is a partially enlarged view of the first auxiliary measurement section 210A of the present embodiment. As shown in FIG. 18, the retroreflective layer 211A of the first auxiliary measurement section 210A of the present embodiment is formed into a wave-shaped uneven shape in which a distance from the axis Z changes along the circumferential direction Cd. The wave shape of the retroreflective layer 211A is a shape obtained by combining, e.g., arcs each corresponding to about ¼ of a circumference.

The retroreflective layer 211A shown in FIG. 18 is formed into the wave shape obtained by combining arcs, and hence a direction of a tangent to an outer peripheral surface and the circumferential direction Cd match each other at each of a peak and a valley. On the other hand, in part of a surface coupling the peak and the valley, an angle which the surface forms with the circumferential direction Cd is not less than a predetermined angle (e.g., 45 degrees). The retroreflective layer 211A has a plurality of first areas 211Aa in each of which the distance from the axis Z gradually increases along the circumferential direction Cd and an angle which the first area 211Aa forms with the circumferential direction Cd is not less than a predetermined angle (e.g., 45 degrees). The retroreflective layer 211A has a plurality of second areas 211Ab in each of which the distance from the axis Z gradually decreases along the circumferential direction Cd and an angle which the second area 211Ab forms with the circumferential direction Cd is not less than a predetermined angle (e.g., 45 degrees).

According to the target device of the present embodiment, the retroreflective layer 211A has the plurality of first areas 211Aa and the plurality of second areas 211Ab. With regard to the measuring light 23 which incidents on the first area 211Aa and the second area 211Ab disposed at each end portion of the target device in the width direction when viewed from the measuring device 100, an angle which the measuring light 23 forms with the incident surface of the retroreflective element is not less than a predetermined angle (e.g., 45 degrees), and hence the incident angle which the measuring light forms with the normal to the incident surface is sufficiently reduced, and it is possible to reliably obtain a sufficient amount of the reflected measuring light 24 from the end portion of the target device.

Third Embodiment

Next, a description will be given of a surveying system according to a third embodiment of the present invention. The present embodiment is a modification of the first embodiment, and it is assumed that the present invention is similar to the first embodiment except a case specifically described below.

In the surveying system of the first embodiment, in the uneven shape of the retroreflective layer 211, 221, or 231 of the target device 200, the plurality of first areas 211*a* and the plurality of second areas 211*b* are alternately disposed along the circumferential direction Cd. In contrast to this, in a retroreflective layer 211B, 221B, or 231B of the present embodiment, a first area 211Ba and a second area 211Bb are connected to each other via a third area 211Bc.

Hereinbelow, a description will be given of a first auxiliary measurement section 210B of the present embodiment and the retroreflective layer 211B of the first auxiliary measurement section 210B. Note that each of the retroreflective layer 221B of a second auxiliary measurement section 220B and the retroreflective layer 231B of a reference measurement section 230B is similar to the retroreflective layer 211B, and hence the description thereof will be omitted in the following description.

Figure 19:
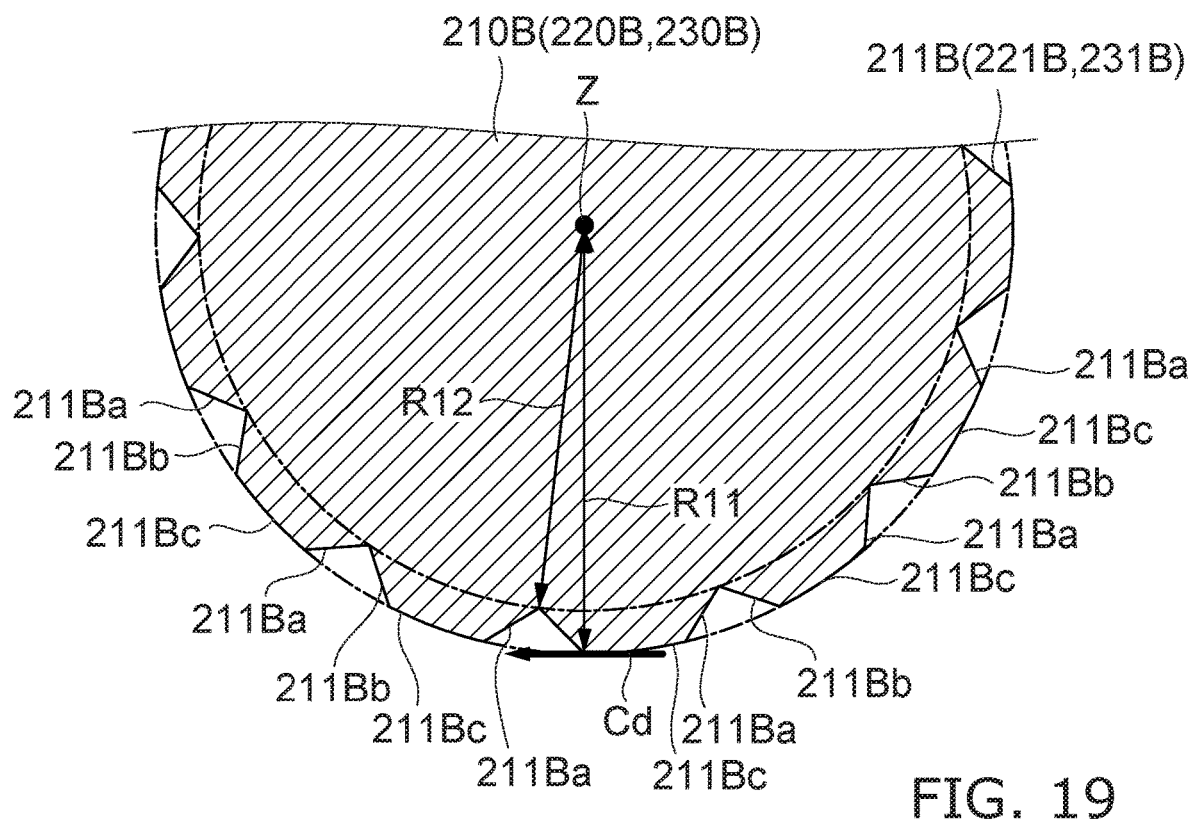
FIG. 19 is a partially enlarged view showing a first auxiliary measurement section of a third embodiment.

FIG. 19 is a partially enlarged view of the first auxiliary measurement section 210B of the present embodiment. As shown in FIG. 19, the retroreflective layer 211B of the first auxiliary measurement section 210B of the present embodiment includes a plurality of first areas 211Ba which are flat surfaces formed so as to extend parallel to the axis Z, and a plurality of second areas 211Bb which are flat surfaces formed so as to extend parallel to the axis Z. In addition, the retroreflective layer 211B includes a third area 211Bc which connects the first area 211Ba and the second area 211Bb. The third area 211Bc of the retroreflective layer 211B shown in FIG. 19 is a curved surface which has the same distance from the axis Z corresponding to R11, and is formed so as to extend parallel to the axis Z.

According to the target device of the present embodiment, in the third area 211Bc disposed at the central portion of the target device in the width direction when viewed from the measuring device 100, an angle formed by the measuring light 23 and the incident surface of the retroreflective element is approximately 90°. Consequently, the target device of the present embodiment can reflect a sufficient amount of reflected light for the measuring light 23 toward the measuring device 100.

Fourth Embodiment

Next, a description will be given of a surveying system according to a fourth embodiment of the present invention. The present embodiment is a modification of the third embodiment, and it is assumed that the present embodiment is similar to the third embodiment except a case specifically described below.

In the retroreflective layer 211B, 221B, or 231B of the third embodiment, the first area 211Ba and the second area 211Bb are connected to each other via the third area 211Bc. In the present embodiment, a fourth area 211Cd is further provided in addition to the third area 211Bc.

Hereinbelow, a description will be given of a first auxiliary measurement section 210C of the present embodiment and a retroreflective layer 211C of the first auxiliary measurement section 210C. Note that each of a retroreflective layer 221C of a second auxiliary measurement section 220C and a retroreflective layer 231C of a reference measurement section 230C is similar to the retroreflective layer 211C, and hence the description thereof will be omitted in the following description.

Figure 20:
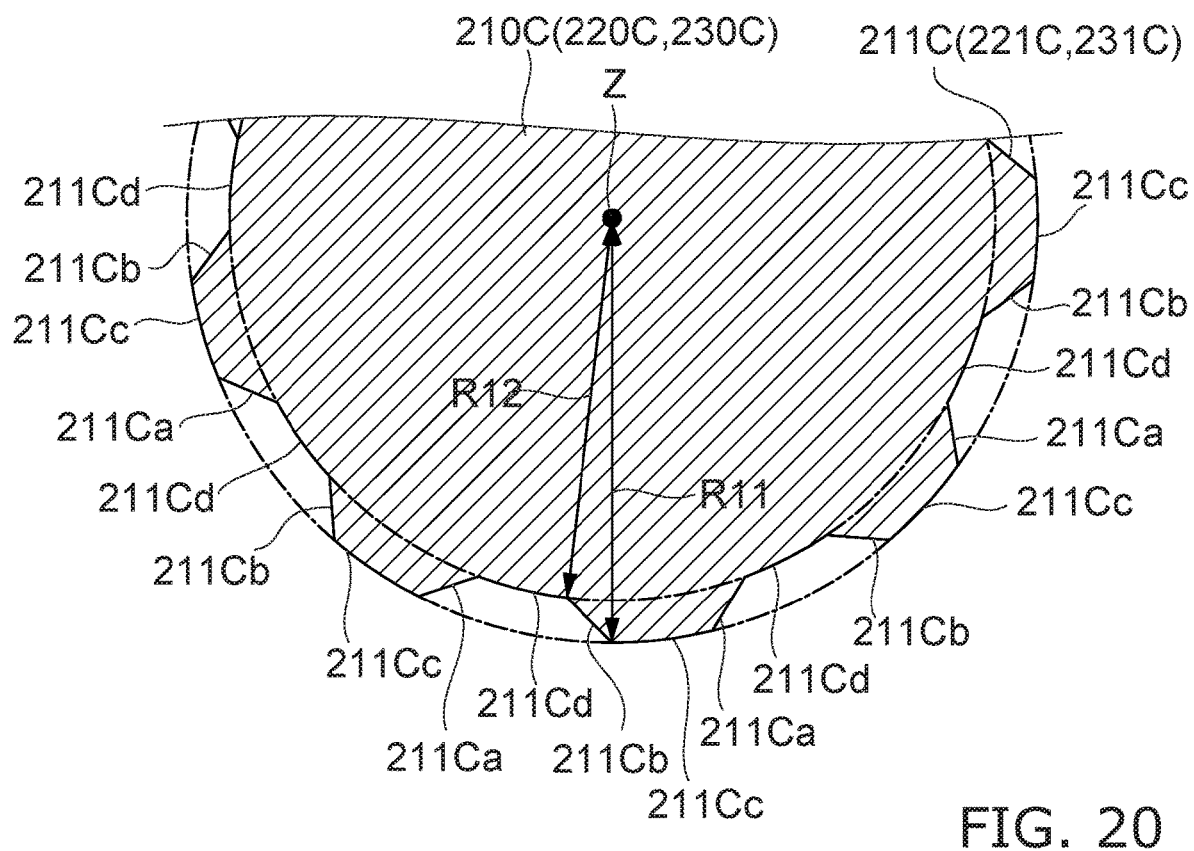
FIG. 20 is a partially enlarged view showing a first auxiliary measurement section of a fourth embodiment.

FIG. 20 is a partially enlarged view of the first auxiliary measurement section 210C of the present embodiment. As shown in FIG. 20, the retroreflective layer 211C of the first auxiliary measurement section 210C of the present embodiment includes a plurality of first areas 211Ca which are flat surfaces formed so as to extend parallel to the axis Z, and a plurality of second areas 211Cb which are flat surfaces formed so as to extend parallel to the axis Z.

In addition, the retroreflective layer 211C includes a third area 211Cc and the fourth area 211Cd each of which connects the first area 211Ca and the second area 211Cb. The third area 211Cc of the retroreflective layer 211C shown in FIG. 20 is a curved surface which has the same distance from the axis Z corresponding to R11, and is formed so as to extend parallel to the axis Z. The fourth area 211Cd of the retroreflective layer 211C shown in FIG. 20 is a curved surface which has the same distance from the axis Z corresponding to R12, and is formed so as to extend parallel to the axis Z.

According to the target device of the present embodiment, in each of the third area 211Cc and the fourth area 211Cd disposed at the central portion of the target device in the width direction when viewed from the measuring device 100, the incident angle formed by the measuring light 23 and the normal to the incident surface of the retroreflective element is approximately 0 degrees. Consequently, the target device of the present embodiment can reflect a sufficient amount of reflected light for the measuring light 23 toward the measuring device 100.

Fifth Embodiment

Next, a description will be given of a surveying system according to a fifth embodiment of the present invention. The present embodiment is a modification of the first embodiment, and it is assumed that the present embodiment is similar to the first embodiment except a case specifically described below.

Figure 21:
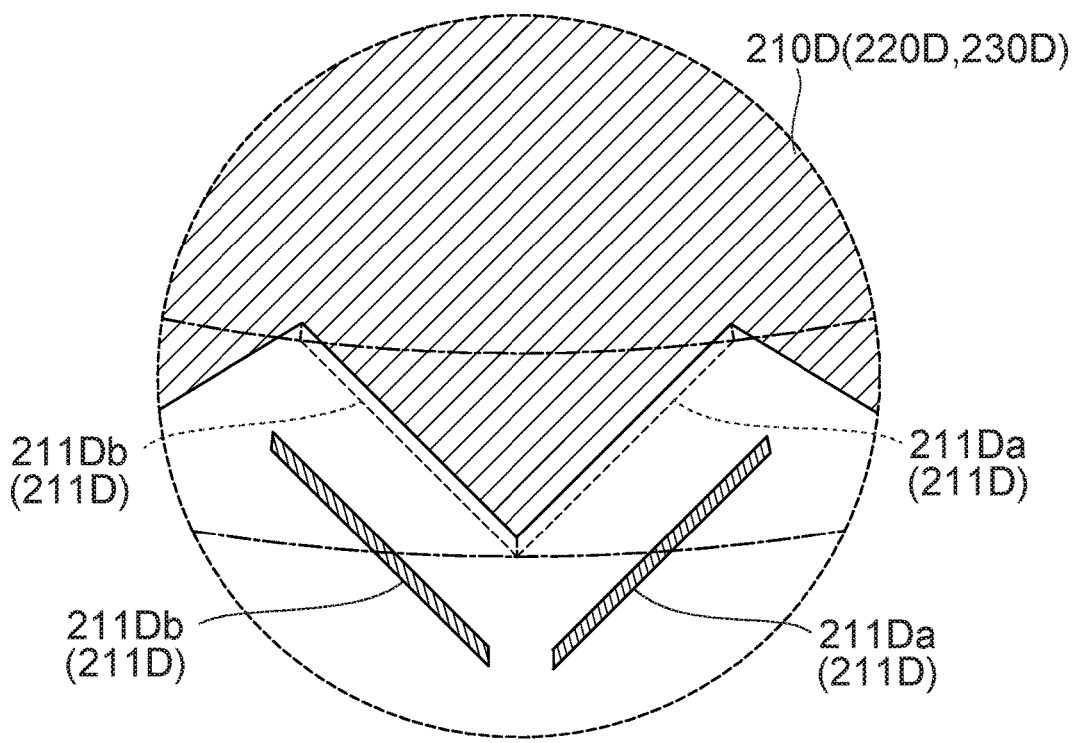
FIG. 21 is a partially enlarged view showing a first auxiliary measurement section of a fifth embodiment.

In the first embodiment, the retroreflective layer 211 in which the plurality of first areas 211a and the plurality of second areas 211b are alternately disposed is formed by folding one sheet material in which the retroreflective elements 211c are arranged. In contrast to this, in the present embodiment, as shown in FIG. 21, a retroreflective layer 211D is formed by preparing a belt-like sheet material which forms a first area 211Da and a belt-like sheet material which forms a second area 211Db, and sticking the sheet materials to the main body of a first auxiliary measurement section 210D. Portions indicated by broken lines in FIG. 21 are areas to which the belt-like sheet material which forms the first area 211Da and the belt-like sheet material which forms the second area 211Db are stuck.

Note that it is assumed that each of the retroreflective layer of a second auxiliary measurement section 220D and the retroreflective layer of a reference measurement section 230D is similar to the retroreflective layer 211D. According to the present embodiment, in the case where it is difficult to accurately fold one sheet material such as the case where the width of each of the first area 211Da and the second area 211Db is small, it is possible to form the retroreflective layer 211D by sticking the belt-like sheet materials to the main body of the first auxiliary measurement section 210D.

Sixth Embodiment

Next, a description will be given of a surveying system according to a sixth embodiment of the present invention. The present embodiment is a modification of the first embodiment, and it is assumed that the present embodiment is similar to the first embodiment except a case specifically described below.

In the first embodiment, the retroreflective layer 211 in which the plurality of first areas 211a and the plurality of second areas 211b are alternately disposed is formed by folding one sheet material in which the retroreflective elements 211c are arranged. In contrast to this, in the present embodiment, a retroreflective layer 211E is formed by disposing a plurality of cylindrical tubes on the outer peripheral surface of the main body of a first auxiliary measurement section 210E. Note that it is assumed that each of the retroreflective layer of a second auxiliary measurement section 220E and the retroreflective layer of a reference measurement section 230E is similar to the retroreflective layer 211E.

Figure 22:
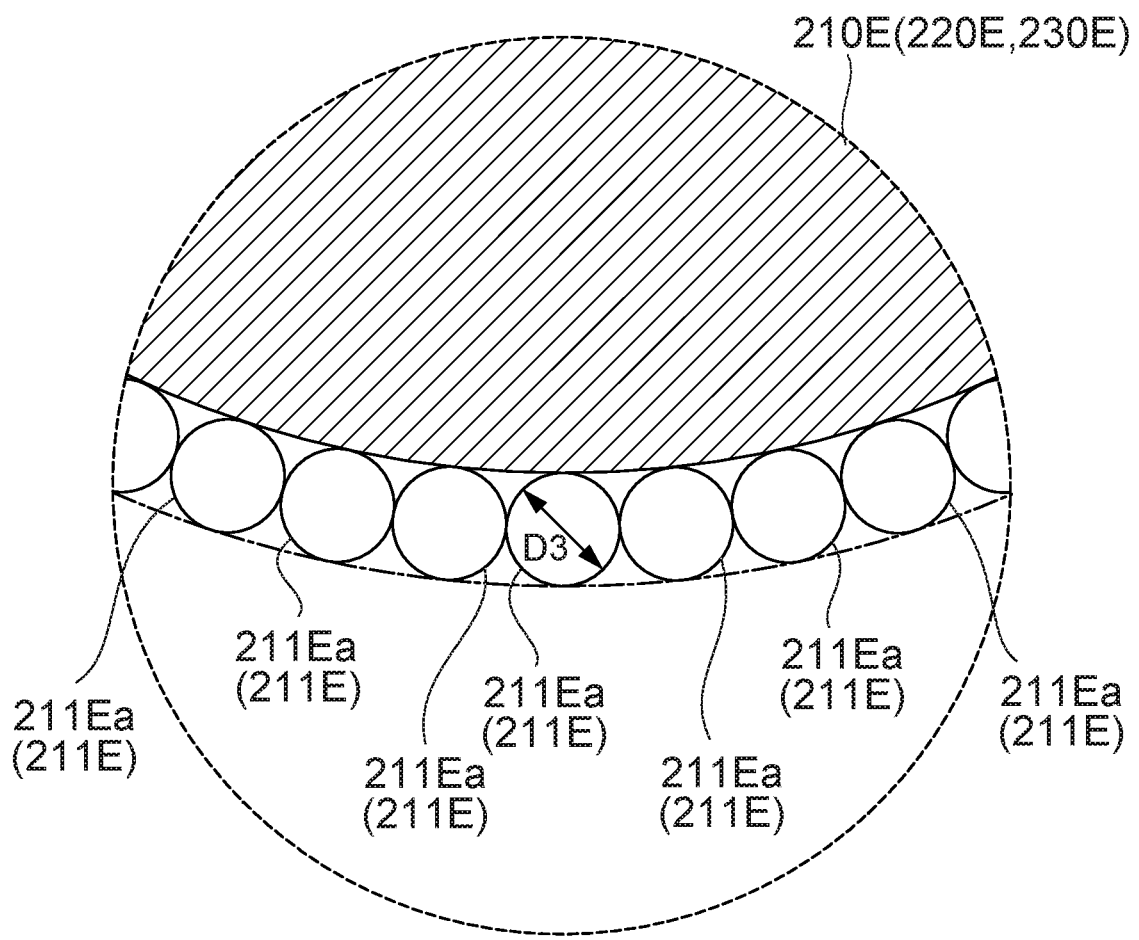
FIG. 22 is a partially enlarged view showing a first auxiliary measurement section of a sixth embodiment.

As shown in FIG. 22, in the first auxiliary measurement section 210E of the present embodiment, tubes formed of retroreflective layers 211Ea in each of which a plurality of retroreflective elements are arranged are disposed adjacent to each other on the entire circumference of the first auxiliary measurement section 210E in the circumferential direction Cd. The tube is a member formed by rolling one sheet material in which the retroreflective elements are arranged into a tubular shape. As shown in FIG. 22, an outer diameter D3 (a third outer diameter) of the tube is sufficiently smaller than each of an outer diameter D1 of the first auxiliary measurement section 210E and an outer diameter D2 of the second auxiliary measurement section 220E.

According to the target device of the present embodiment, it is possible to easily form the retroreflective layer 211E having an uneven shape by preparing the tube in which the retroreflective elements are arranged as a component in advance and disposing the tubes on the entire circumference in the circumferential direction such that the tubes are adjacent to each other.

Seventh Embodiment

Next, a description will be given of a surveying system according to a seventh embodiment of the present invention. The present embodiment is a modification of the first embodiment, and it is assumed that the present embodiment is similar to the first embodiment except a case specifically described below.

In the target device 200 of the first embodiment, the retroreflective layer 211 in which the plurality of first areas 211a and the plurality of second areas 211b are alternately disposed is formed by folding one sheet material in which the retroreflective elements 211c are arranged. In contrast to this, in a target device 200F of the present embodiment, protrusions on which retroreflective layers are formed are laid on the outer peripheral surface of a main body portion 230Fa of a reference measurement section 230F which is formed into a substantially spherical shape.

Figure 23:
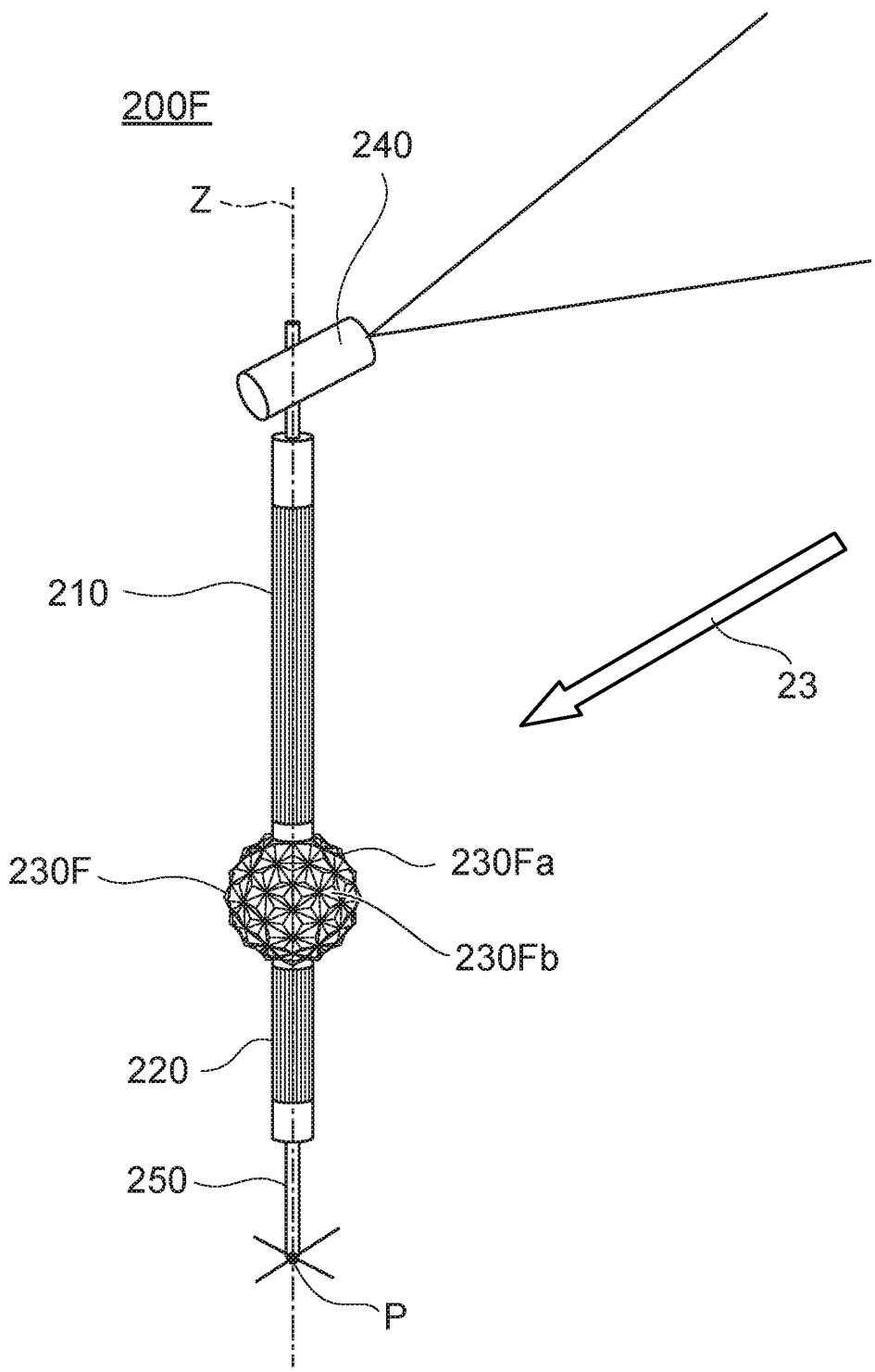
FIG. 23 is an external view of a target device according to a seventh embodiment.
Figure 24:
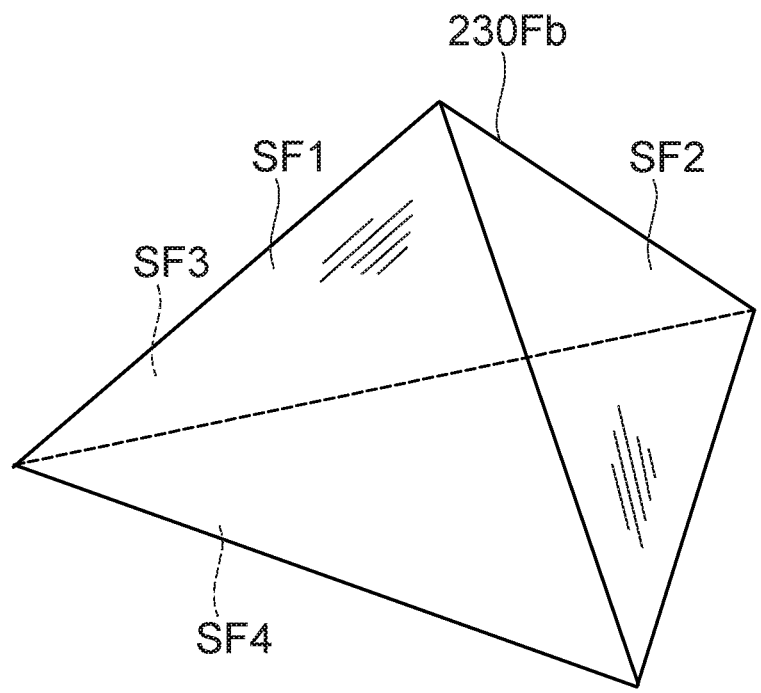
FIG. 24 is a perspective view showing a triangular pyramidal protrusion.

FIG. 23 is an external view of the target device 200F according to the present embodiment. As shown in FIG. 23, the target device 200F includes the reference measurement section 230F. The reference measurement section 230F includes the main body portion 230Fa which is formed into the substantially spherical shape, and a plurality of protrusions 230Fb which are attached to the outer peripheral surface of the main body portion 230Fa. As shown in FIG. 24, the protrusion 230Fb is a triangular pyramidal structure having three surfaces SF1, SF2, and SF3 which are orthogonal to each other, and a bottom surface SF4 which intersects the surfaces SF1, SF2, and SF3. The length of one side of the equilateral triangular bottom surface SF4 is set to, e.g., 0.5 mm or more and 2.0 mm or less.

The plurality of protrusions 230Fb shown in FIG. 24 are attached such that the center of the bottom surface SF4 of each protrusion 230Fb comes into contact with the outer peripheral surface of the main body portion 230Fa. The retroreflective layer in which the plurality of retroreflective elements described in the first embodiment are arranged is formed on each of the three surfaces SF1, SF2, and SF3 of each of the plurality of protrusions 230Fb. Consequently, in the case where the measuring light 23 is applied to the protrusion 230Fb attached to the end portion of the reference measurement section 230F, an incident angle formed by a normal to any one of the three surfaces SF1, SF2, and SF3 and the measuring light 23 is equal to or less than a predetermined angle (e.g., 45 degrees), and the measuring light 23 is reflected as the reflected measuring light 24.

Figure 25:
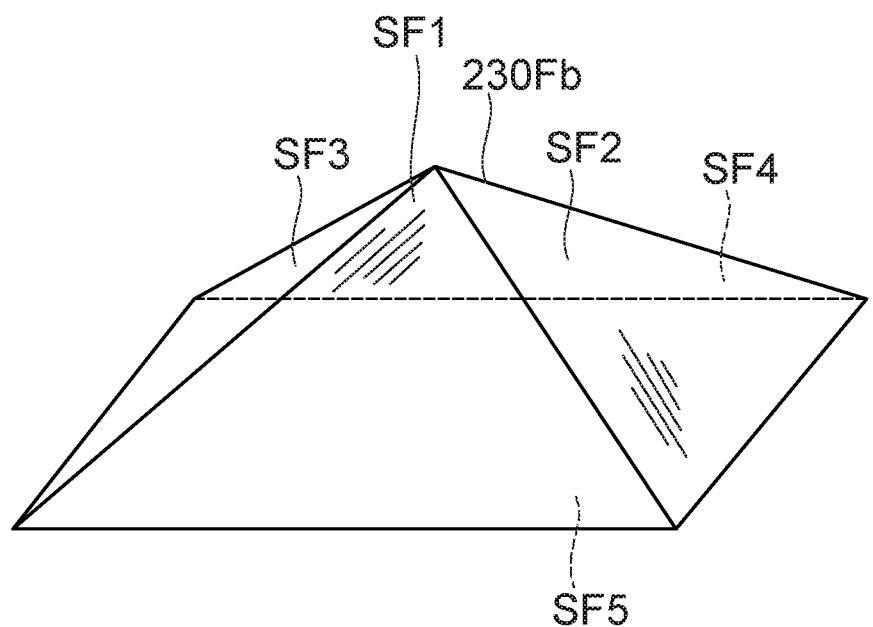
FIG. 25 is a perspective view showing a square pyramidal protrusion.

Each of the plurality of protrusions 230Fb shown in FIG. 24 is the triangular pyramidal structure, but the protrusion 230Fb may also be a structure having another shape. For example, as shown in FIG. 25, the protrusion 230Fb may also be a square pyramidal structure having a square bottom surface SF5 and four triangular surfaces SF1, SF2, SF3, and SF4 each of which has, as its side, one of the sides of the bottom surface SF5. The square pyramidal protrusion 230Fb is attached such that the center of the bottom surface SF5 comes into contact with the outer peripheral surface of the main body portion 230Fa.

According to the target device 200F of the present embodiment, the protrusions 230Fb each having the triangular pyramidal shape obtained by cutting off one corner from a cube are formed on the outer peripheral surface of the main body portion 230Fa of the reference measurement section 230F which is formed into the substantially spherical shape. The retroreflective layer is formed on each of the three surfaces of the protrusion 230Fb which are orthogonal to each other, and hence it is possible to provide the target device 200F which allows a sufficient amount of reflected light to be obtained from the end portion.

The embodiments of the present invention have been described thus far. However, the present invention is not limited to the embodiments described above and may be variously modified without departing from the scope of the claims. The configurations of the embodiments described above may be partially omitted and may also be optionally combined in a manner different from those described above.

The invention claimed is:

1. A target device which is to be measured with measuring light emitted by a measuring device, the target device comprising:
a measurement section which is substantially in a shape of a solid of revolution about an axis,
wherein a retroreflective layer in which a plurality of retroreflective elements are arranged on an entire circumference in a circumferential direction about the axis is on at least part of an outer peripheral surface of the measurement section, and
the retroreflective layer is a shape, wherein the shape comprises a peak of a first distance from the axis and a valley of a second distance from the axis, the second distance smaller than the first distance, the peak and the valley being in a cyclical configuration such that a distance from the axis changes along the entire circumference in the circumferential direction.

2. The target device according to claim 1,
wherein the measurement section includes:
a first auxiliary measurement section having a first outer diameter about the axis;
a second auxiliary measurement section having a second outer diameter about the axis; and
a reference measurement section disposed between the first auxiliary measurement section and the second auxiliary measurement section, and having a predetermined outer diameter that is greater than each of the first outer diameter and the second outer diameter, about the axis.

3. The target device according to claim 2,
wherein the retroreflective layer has a plurality of first areas in each of which a distance from the axis gradually increases along the circumferential direction and an angle which the first area forms with the circumferential direction is not less than a predetermined angle, and a plurality of second areas in each of which a distance from the axis gradually decreases along the circumferential direction and an angle which the second area forms with the circumferential direction is not less than the predetermined angle.

4. The target device according to claim 3,
wherein each of the first area and the second area is a surface that extends parallel to the axis, and the first area and the second area are at a regular interval along the circumferential direction.

5. The target device according to claim 4,
wherein the first area and the second area are flat surfaces, extend parallel to the axis, and are disposed adjacent to each other.

6. The target device according to claim 5,
wherein the retroreflective layer has a third area which is a curved surface and has the same distance from the axis and extends parallel to the axis, and
the first area and the second area are connected to each other via the third area.

7. The target device according to claim 2,
wherein the retroreflective layer comprises a plurality of tubes each of which has a third outer diameter which is less than each of the first outer diameter and the second outer diameter, and in each of which the plurality of retroreflective elements are arranged on a surface on the entire circumference in the circumferential direction such that the plurality of tubes are adjacent to each other.

8. The target device according to claim 1,
wherein the retroreflective layer has a plurality of first areas in each of which a distance from the axis gradually increases along the circumferential direction and an angle which the first area forms with the circumferential direction is not less than a predetermined angle, and a plurality of second areas in each of which a distance from the axis gradually decreases along the circumferential direction and an angle which the second area forms with the circumferential direction is not less than the predetermined angle.

9. The target device according to claim 8,
wherein each of the first area and the second area is a surface that extends parallel to the axis, and the first area and the second area are at a regular interval along the circumferential direction.

10. The target device according to claim 9,
wherein the first area and the second area are flat surfaces, extend parallel to the axis, and are disposed adjacent to each other.

11. The target device according to claim 10,
wherein the retroreflective layer has a third area which is a curved surface and has the same distance from the axis and extends parallel to the axis, and
the first area and the second area are connected to each other via the third area.

12. The target device according to claim 1,
wherein the measurement section includes:
a main body portion in a substantially spherical shape; and
a plurality of triangular pyramidal protrusions each of which is attached to an outer peripheral surface of the main body portion and has three surfaces orthogonal to each other and a bottom surface intersecting the three surfaces, and the retroreflective layer in which the plurality of retroreflective elements are arranged on each of the three surfaces of the protrusion.

13. A measuring system comprising:

a target device; and a measuring device configured to detect a measuring point of the target device by applying measuring light to the target device and receiving reflected light from the target device, wherein the target device includes a measurement section which is substantially in a shape of a solid of revolution about an axis, and wherein a retroreflective layer a plurality of retroreflective elements are arranged on an entire circumference in a circumferential direction about the axis is on at least part of an outer peripheral surface of the measurement section, and the retroreflective layer a shape, wherein the shape comprises a peak of a first distance from the axis and a valley of a second distance from the axis, the second distance smaller than the first distance, the peak and the valley being in a cyclical configuration such that a distance from the axis changes along the entire circumference in the circumferential direction.

* * * * *

UNITED STATES PATENT AND TRADEMARK OFFICE
CERTIFICATE OF CORRECTION

| | |
|---|---|
| PATENT NO. | : 11,630,186 B2 |
| APPLICATION NO. | : 16/676405 |
| DATED | : April 18, 2023 |
| INVENTOR(S) | : Nobuyuki Nishita |

It is certified that error appears in the above-identified patent and that said Letters Patent is hereby corrected as shown below:

In the Specification

Column 5, Line 13:
FIG. 8 is a cross-sectional view taken along arrows of the target device shown in FIG. 5;

Should read:
-- FIG. 8 is a cross-sectional view taken along arrows III-III of the target device shown in FIG. 5; --

Signed and Sealed this
Fifteenth Day of August, 2023

Katherine Kelly Vidal
*Director of the United States Patent and Trademark Office*